(12) United States Patent
Takahashi et al.

(10) Patent No.: US 6,379,837 B1
(45) Date of Patent: Apr. 30, 2002

(54) BATTERY DEVICE LOADED ON MOVING BODY

(75) Inventors: Hideya Takahashi, Fukushima; Ryoichi Yamane; Yoshikazu Kanaishi, both of Tokyo, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/501,715

(22) Filed: Feb. 10, 2000

(30) Foreign Application Priority Data

Feb. 15, 1999 (JP) .......................................... 11-036333
Jan. 26, 2000 (JP) .......................................... 2000-021840

(51) Int. Cl.⁷ .......................... H01M 2/10; H01M 10/50
(52) U.S. Cl. ........................ 429/151; 429/120; 429/148; 429/159
(58) Field of Search .............................. 429/61.99, 120, 429/148, 151, 156, 159

(56) References Cited

U.S. PATENT DOCUMENTS

| | | | | |
|---|---|---|---|---|
| 1,606,391 A | * | 9/1926 | Schulte .......................... | 429/99 |
| 2,836,642 A | * | 5/1958 | Bauer ...................... | 429/156 X |
| 4,883,726 A | * | 11/1989 | Peled et al. ................... | 429/120 |
| 5,866,276 A | | 2/1999 | Ogami et al. ................ | 429/120 |
| 6,147,618 A1 | * | 1/2001 | Nishiyama et al. ........... | 429/99 |
| 6,232,013 B1 | * | 5/2001 | Clarke et al. .............. | 429/99 X |

FOREIGN PATENT DOCUMENTS

| EP | 0892450 A2 | 1/1999 |
|---|---|---|
| EP | 0897195 A2 | 2/1999 |

\* cited by examiner

*Primary Examiner*—Stephen Kalafut
(74) *Attorney, Agent, or Firm*—Rader, Fishman & Grauer, PLLC

(57) ABSTRACT

A battery device in which a large number of secondary batteries are efficiently housed and cemented strongly so that malfunctioning secondary batteries found after assembling can be exchanged and so that unusual heat evolution can be detected reliably. To this end, a pair of modular casing halves 43, 44 having battery housing half sections 49, 64 and a large number of terminal openings 46, 47 communicating with the battery housing half sections are coupled to each other to constitute a modular casing 13 having a battery housing section 45. A large number of secondary batteries 12 are housed in the battery housing section so that both end terminals of the secondary batteries will be exposed to outside through the terminal openings. Each modular casing half is provided with bottomed adhesive charging openings 72 in register with the respective terminal openings and adhesive efflux opening parts 78 communicating with the terminal openings and with the adhesive charging openings. An adhesive 76 charged through the adhesive charging openings is affixed to the outer periphery of the secondary batteries through the adhesive efflux opening parts to cement the ends of the secondary batteries to the terminal openings.

11 Claims, 19 Drawing Sheets

BATTERY DEVICE LOADED ON MOVING BODY

BACKGROUND OF THE INVENTION

1. Field of the Invention

This invention relates to a battery device loaded on a moving body, such as a car or a vessel. As an example, the invention relates to a battery device that may be loaded with advantage on a hybrid system car where the battery and an internal combustion engine are selectively switched so as to be used alternatively as a driving source.

2. Description of Prior Art

For coping with the problems of resources and environment, an electric car, having a battery device as a driving source, is attracting attention as substitution for a gasoline engine car or a diesel engine car. Up to now, a lead accumulator has been used as a driving source for the car electric system. Thus, in the development of an electric car, the battery device used was basically a lead accumulator. However, in order to realize a practically satisfactory running distance by charging only once, an excessively large size or weight of the battery device poses a problem in connection with the use of the lead accumulator.

For this reason, attempts are being made for developing a practically usable hybrid car system where switching is suitably made between an electric motor and a conventional internal combustion engine depending on the running conditions to suppress the excessive size of the battery device fishing the power to the motor as well as to achieve energy saving and cleanness in operation. On the other hand, attempts are being made to use a lithium ion secondary battery in place of the conventional lead accumulator, in view of the high performance and lightness in weight of the lithium ion secondary battery, in consideration that a higher voltage of tens to hundreds of volt, a higher energy density and higher output specifications are demanded of the car battery device.

For example, in Japanese Laying-Open Patent H-9-86188 entitled "Battery Device for Electric Car", there is disclosed a car battery device in which a large number of lithium ion secondary batteries are accommodated in a large number of separate chambers in a battery casing split into an upper half and a lower half, the abutting surfaces of which are formed as-one with a large number of semi-cylindrical ribs. The battery casing is completed on unifying the upper and lower halves together. At this time, a large number of separate chambers are formed by facing ribs for accommodating columnar-shaped lithium ion secondary batteries.

The ribs are formed with several grooves at several longitudinal points. In these grooves, an adhesive for cementing the lithium ion secondary batteries is charged into these grooves. On unifying the upper and lower halves together to complete the battery casing, the respective lithium ion secondary batteries are sandwiched between the neighboring ribs and are secured in position by the adhesive applied at several longitudinal points.

In the above-described prior-art car battery device, the respective lithium ion secondary batteries are protected against severe vibrations or shocks by being housed in the separate chambers defined by arcuate partitioning wall sections provided in the battery casing and by being secured by an adhesive applied at the several longitudinal points. Therefore, if, in the prior-art car battery device, an excessive amount of the adhesive is charged into a groove in the partitioning wall section, the lithium ion secondary battery accommodated therein is floated so that it is not cemented fixedly to the inner periphery of the partitioning wall section. In the prior-art car battery device, the lithium ion secondary batteries tend to be moved due to vibrations or the like, under the low bonding force caused by such floating, thus raising the problem of insufficient contact. Thus, in the above-described prior-art car battery device, charging of the adhesive needs to be performed under meticulously controlled conditions to apply the adhesive evenly in the large number of grooves, thus lowering the operating efficiency.

Moreover, in the prior-art car battery device, a large number of lithium ion secondary batteries are accommodated in the battery casing, and are cemented in position with an adhesive. Thus, in the prior-art car battery device, a large quantity of the adhesive is used and a large number of process steps are involved in charging the adhesive to the grooves, with the result that the production cost tends to be raised. Moreover, the prior-art car battery device suffers from the problem of increased overall weight due to the use of a large quantity of the adhesive.

In addition, in the prior-art car battery device, the lithium ion secondary batteries are accommodated in one of the battery casing halves, after which the other battery casing half is bonded to the firstly stated half to perform the processing of the next process step. Thus, the prior-art car battery device suffers from the problem that extremely labor-consuming operations of accommodating a large number of lithium ion secondary batteries and assembling the battery casing halves are required, while the adhesive needs to be cured over a prolonged time, thus lowering the efficiency.

On the other hand, in the prior-art car battery device, the lithium ion secondary batteries are manufactured by separate steps and accommodated in the battery casing. In the prior-art car battery device, operating tests are conducted following the above-described assembling operations. If malfunctions in certain lithium ion secondary batteries are found by this operational test, the entire car battery device has to be rejected because considerable difficulties are met in replacing the malfunctioning lithium ion secondary batteries cemented in position in the battery casing by the adhesive.

In the car battery device, a variety of detection sensors, such as a voltage sensor or a temperature sensor, are provided to assure normal and safe operations. The car battery device is constructed so that the lithium ion secondary batteries are checked for unusual heat evolution by e.g., a temperature sensor and, if such unusual heat evolution is detected, an unusual situation detection signal is sent from the temperature sensor to a controller to execute a pre-set control operation.

In the prior-art car battery device, a temperature sensor is cemented on the outer periphery of the pre-set lithium ion secondary batteries with an adhesive and the entire assembly is housed in this state in the battery casing. The prior-art car battery device thus suffers from the problem that there is required a process step of holding the temperature sensor by e.g., a holding jig on the outer periphery of the lithium ion secondary batteries, until the adhesive is cured, thus again lowering the efficiency. Also, the prior-art car battery device suffers from the problem that stable detection operations cannot be realized because no measures are used to control the mounting position of the temperature sensor on the lithium ion secondary battery.

SUMMARY OF THE INVENTION

It is therefore an object of the present invention to provide a battery device loaded on a moving body where a large number of secondary batteries can be efficiently accommodated and fixedly cemented in position in the battery housing section in a modular casing, malfunctioning batteries, if any, can be readily exchanged and unusual heat evolution can be detected in stability.

The present invention provides a battery device for loading on a moving body including a modular casing having a battery housing section therein and a large number of terminal openings, a large number of secondary batteries housed in the battery housing section so that terminal portions thereof are exposed to outside through the terminal openings, an adhesive charging opening and an adhesive efflux opening part in register with each terminal opening. The adhesive efflux opening part communicates with each terminal opening and with the adhesive charging opening, so that the adhesive efflux opening part causes the adhesive charged through the adhesive charging opening to flow around the peripheral surface of the secondary battery. The secondary battery is cemented to peripheral wall portions around the terminal openings.

In the battery device for loading on a moving body, according to the present invention, if, with the secondary battery housed in the battery housing section in the modular casing, the adhesive is charged through the adhesive charging opening, this adhesive is allowed to flow through the adhesive efflux opening part to the terminal opening to become attached to the peripheral surface of the secondary battery to secure the secondary battery to the terminal opening. In the battery device for loading on a moving body, if the amount of the adhesive charged into the adhesive charging opening exceeds a moderate amount, it is allowed to overflow the opening to indicate that a moderate amount of the adhesive has been charged to permit facilitated control of the adhesive charging volume.

Thus, in the battery device for loading on a moving body, the secondary battery can be fixedly bonded in the battery housing section of the modular casing with a small amount of the adhesive, whilst the cost of the material or the number of process steps or the overall weight can be decreased. On the other hand, in the battery device for loading on a moving body, since the secondary batteries are housed in a floated state in the battery housing section, the flow duct for the cooling air is secured in the inside of the device to permit efficient cooling.

In the battery device for loading on a moving body, there is formed a punching guide groove around the terminal opening. If, in the battery device for loading on a moving body, malfunctions of a secondary battery are found out in a post-assembly operating test, the outer periphery of the terminal opening is punched along the punching guide recessed groove to form a punched opening through which to take out the secondary battery housed in the battery housing section. In the battery device for loading on a moving body, only malfunctioning secondary batteries can be exchanged with manifest economic advantages.

In the battery device for loading on a moving body, the temperature detection sensor is assembled in the adhesive charging opening to secure a detection part of the temperature detection sensor through the adhesive efflux opening part to the vicinity of the outer periphery of the secondary battery. Therefore, in the battery device for loading on a moving body, the temperature detection sensor can be assembled easily to permit temperature control of the secondary batteries with stability and high accuracy.

In the battery device for loading on a moving body, a number of adhesive charging openings and adhesive efflux opening parts are formed in register with the terminal openings formed in the modular casing having the battery housing section defined therein. The adhesive charged from the adhesive charging opening flows out via the adhesive efflux opening part to the terminal openings to secure the ends of the secondary batteries to the terminal openings. In the battery device for loading on a moving body, not only is the amount of adhesive consumption reduced, but the adhesive is allowed to overflow the opening to indicate charging of a moderate amount of the adhesive to assure reliable bonding of the secondary batteries, with the result that the cost and/or the weight can be reduced to reduce the mounting defects of the secondary batteries to improve the quality of the battery device.

Moreover, in the battery device for loading on a moving body, according to the present invention, a punching guide recessed groove is formed around the terminal opening, such that, if a secondary battery is found to be malfunctioning in the post-assembly operation test, the outer periphery of the terminal opening can be punched along the punching guide recessed groove to form a punched opening through which the malfunctioning secondary battery can be easily taken out from the battery housing section and exchanged without the necessity of taking measures for disposal of the entire device.

In addition, in the battery device for loading on a moving body, according to the present invention, the temperature detection sensor is mounted in the adhesive charging opening so that its detection part can be maintained at a constant position relative to the secondary battery to simplify the mounting operation. This permits temperature control to high precision and a simplified mounting operation.

DESCRIPTION OF THE PREFERRED EMBODIMENTS

Figure 1:
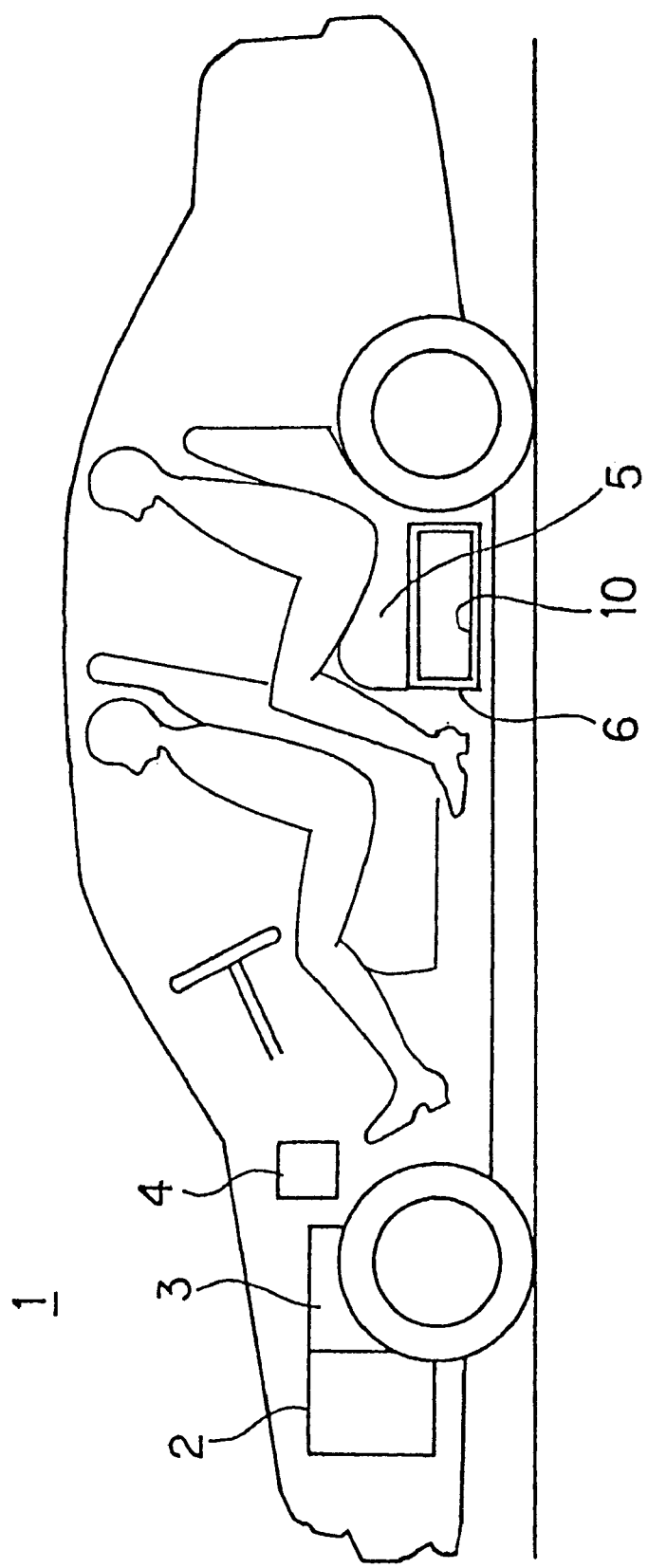
FIG. 1 illustrates a basic structure of a hybrid system car having loaded thereon a battery device embodying the present invention.

Referring to the drawings, preferred embodiments of a battery device according to the present invention will be explained in detail. A battery device 10, shown as a preferred embodiment, is loaded on a hybrid system car, as shown in FIG. 1, and furnishes the electric power to an electric motor 3 used in conjunction with an engine 2 as a driving source. Although a variety of systems have been proposed as the hybrid system car 1, the basic structure is switching between the engine 2 and the electric motor 3 by a controller 4. In the hybrid system car 1, the driving is by an electric motor 3 in a low engine efficiency running area, such as during startup or low-speed running, whilst the engine 2 is used for driving in a running area, such as high-speed running. In the hybrid system car 1, the engine 2 occasionally drives a power generator by an output of the controller to charge a battery device 10.

In the hybrid system car 1, a battery loading unit 6 is provided e.g., below the floor of a rear seat 5. The battery device 10 is loaded on this battery loading unit 6. Thus, the battery device 10 is affected by radiant heat from the road surface, flooding in water during running in rainy weather, rapid changes in temperature or vibrations. However, sufficient reliability is assured by a structure which will be explained subsequently in detail.

Figure 2:
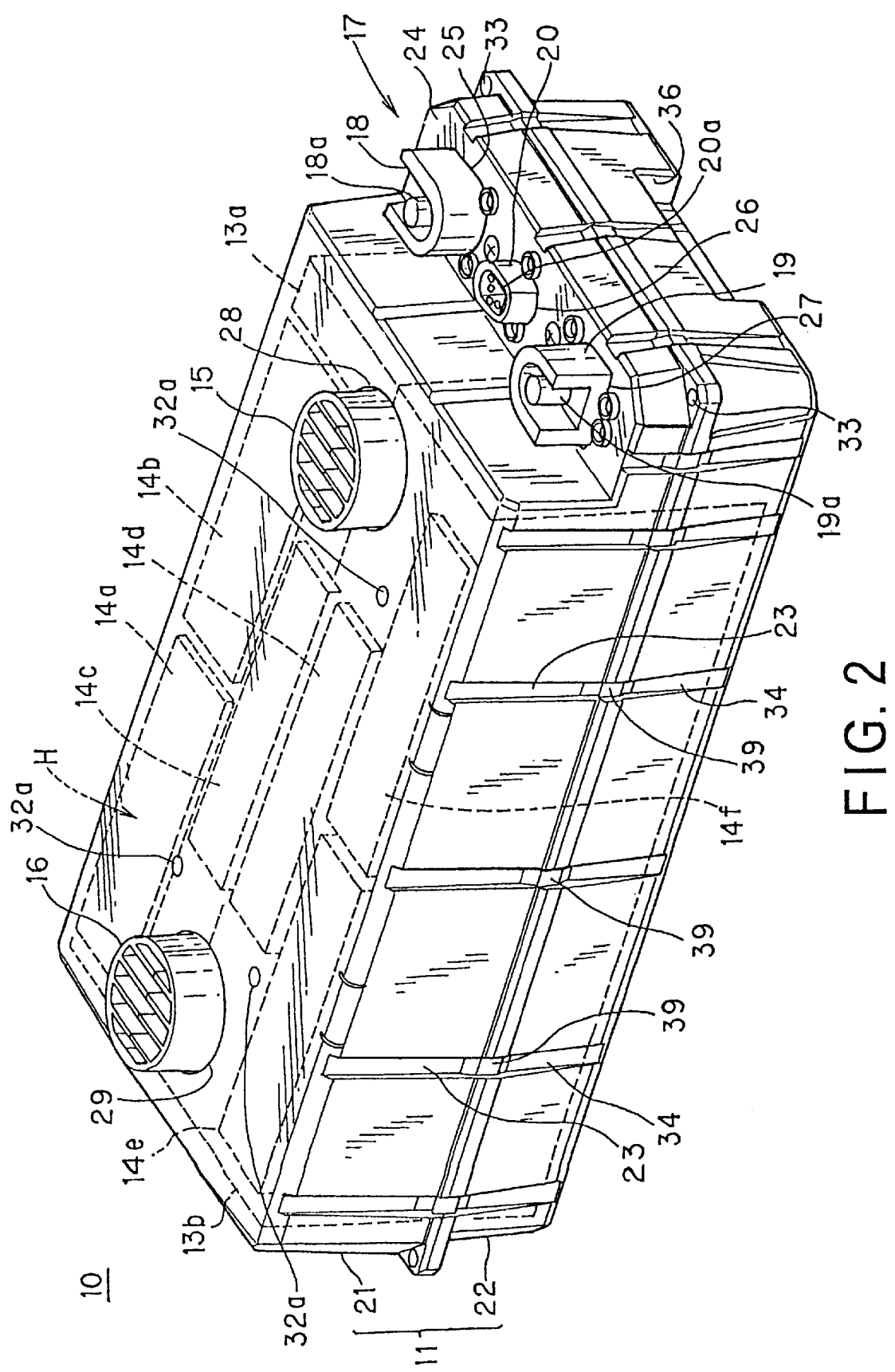
FIG. 2 is a perspective view of the battery device.
Figure 3:
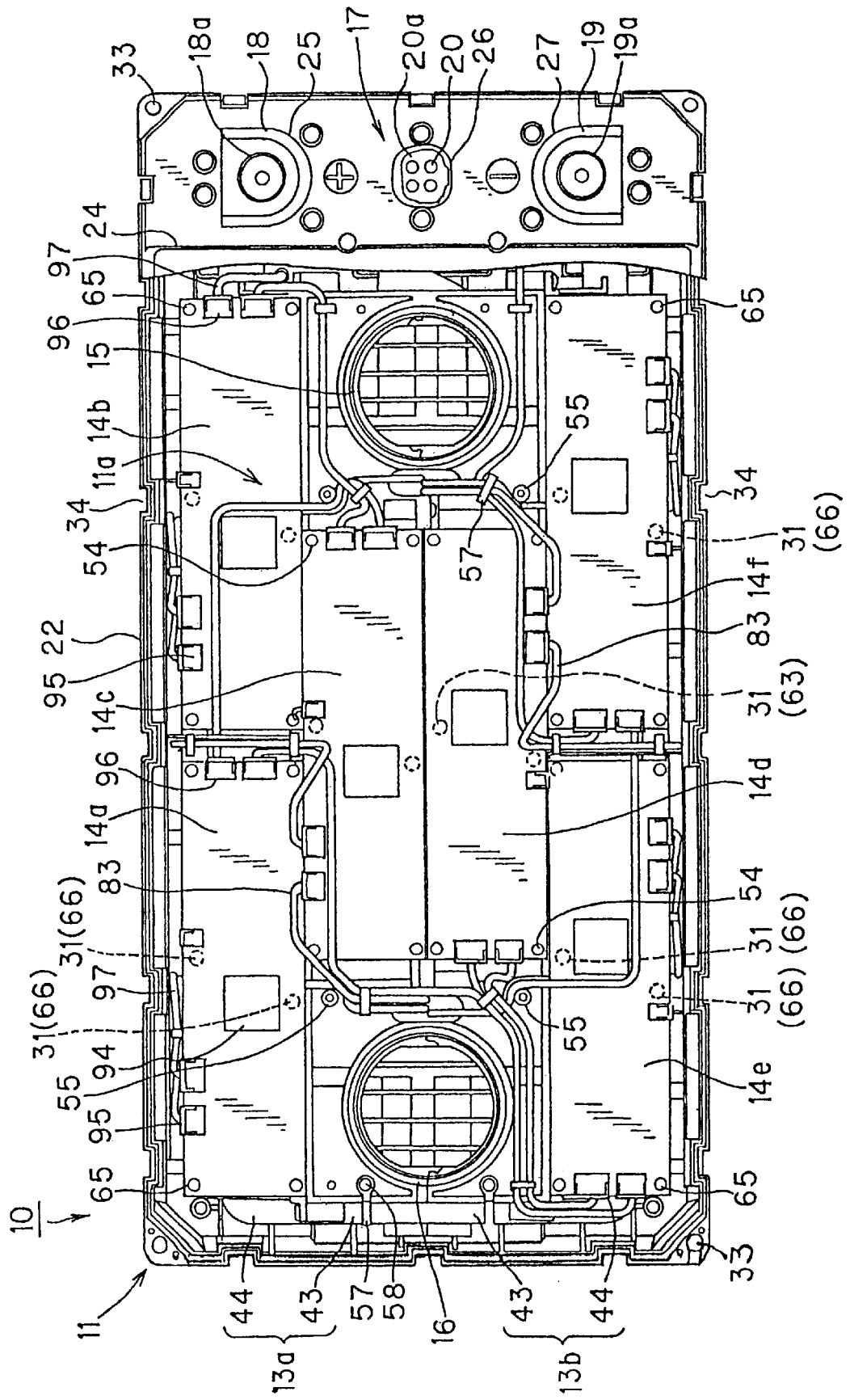
FIG. 3 is a plan view showing the battery device with an upper half of an outer casing member removed.

In the structure of the battery device 10, shown in FIGS. 2 to 5, a modular casing 13, housing a large number of lithium ion secondary batteries 12, as later explained, and six cell control units 14, are sealed in a box-shaped outer casing member 11, as shown in FIGS. 2 to 5. The cell control units 14 are comprised of first to sixth cell control units 14a to 14f, mounted in the modular casing 13. The battery device 10 is comprised of the sole outer casing member 11 and two unit modular casings 13a, 13b housed therein, as shown in FIGS. 2 and 3. The unit modular casings 13a, 13b are of the same structure, as later explained in detail, and are collectively termed a modular casing 13 in the following description unless these two are explained separately.

In the battery device 10, a sum total of 48 lithium ion secondary batteries 12 are housed, with 24 lithium ion secondary batteries and 24 lithium ion secondary batteries being housed in the respective unit modular casings 13a, 13b. Two sets of the battery devices 10 are loaded on the hybrid system car 1, so that there are loaded a sum total of 96 lithium ion secondary batteries 12. In the battery devices 10, battery modules are constituted with each eight lithium ion secondary batteries 12 as a set. In the battery device 10, voltage detection, capacitance control operations or unusual temperature detecting operations are carried out by the cell control units 14, as later explained, for the respective lithium ion secondary batteries 12 or the battery modules.

In the battery device 10, detection signals etc are routed through the cell control units 14 to the controller 4 of the hybrid system car 1, whilst control signals from the controller 4 are received to control the modular batteries and the lithium ion secondary batteries 12. The battery device 10 is configured to maintain insulation between the respective batteries and with the outside by connecting an insulating sheet, not shown, to the lateral sides of the modular casing 13. Of course, the number and/or the battery capacities of the lithium ion secondary batteries 12 differ depending on the specifications of the hybrid system car 1.

With the battery device 10, no special cooling means is needed by employing lithium ion secondary batteries 12 having smaller heat generating capabilities. Instead, air outside the car is taken and circulated in the inside of the outer casing member 11 for cooling. Thus, in the battery device 10, an air suction duct 15 and an air discharge duct 16, formed as-one with the modular casing 13, are protuberantly formed on the upper surface of the outer casing member 11, as shown in respective figures. The air suction duct 15 an the air discharge duct 16 are connected respectively to an air suction unit and an air discharging unit, by a duct pipe, not shown. On one side of the outer casing member 11 of the battery device 10, there is provided a connection unit 17, provided with a positive terminal unit 18, a negative terminal unit 19 and a transmission/reception terminal unit 20, as shown in the respective figures.

Figure 4:
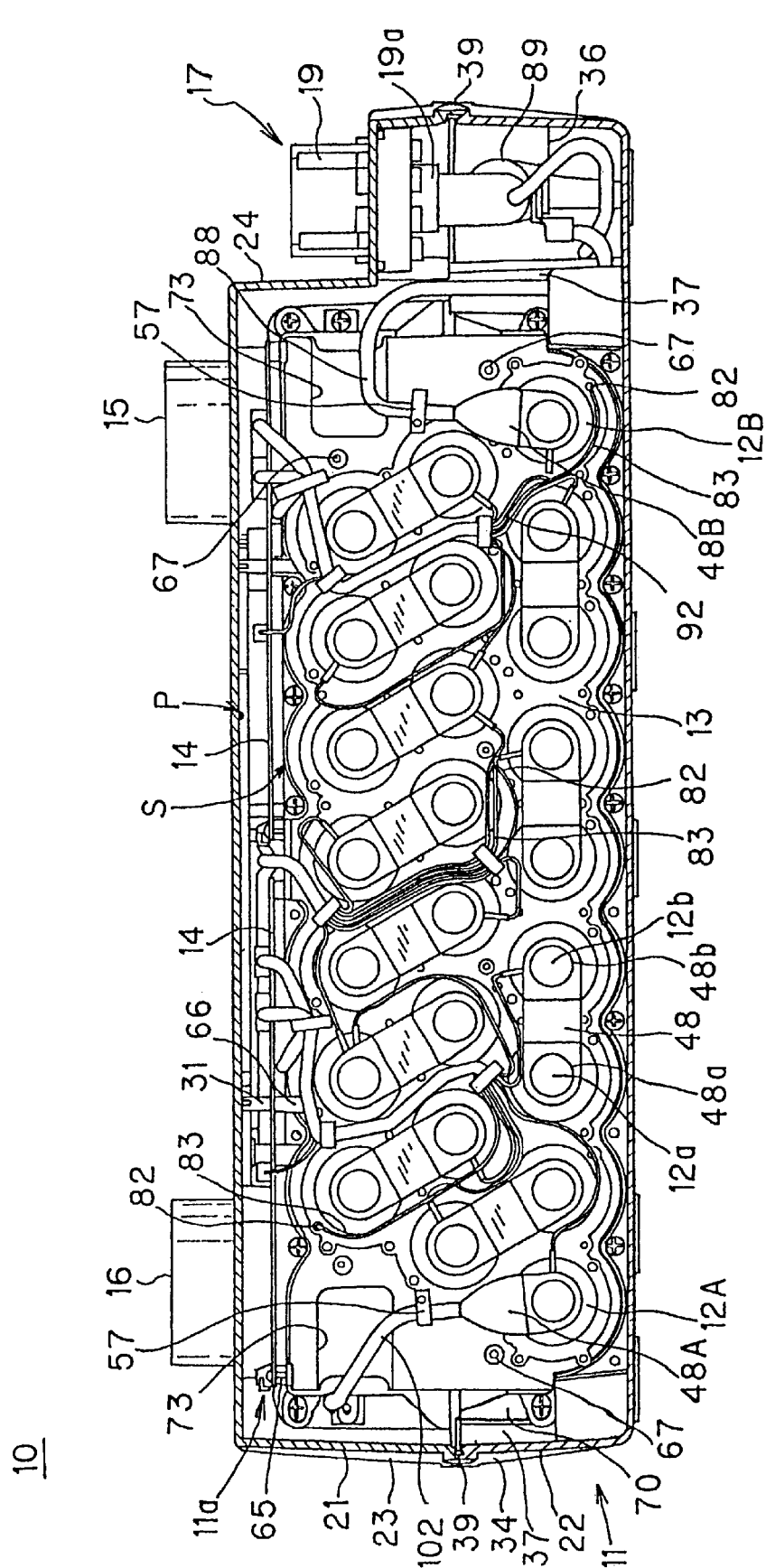
FIG. 4 is a longitudinal cross-sectional view showing the battery device.
Figure 5:
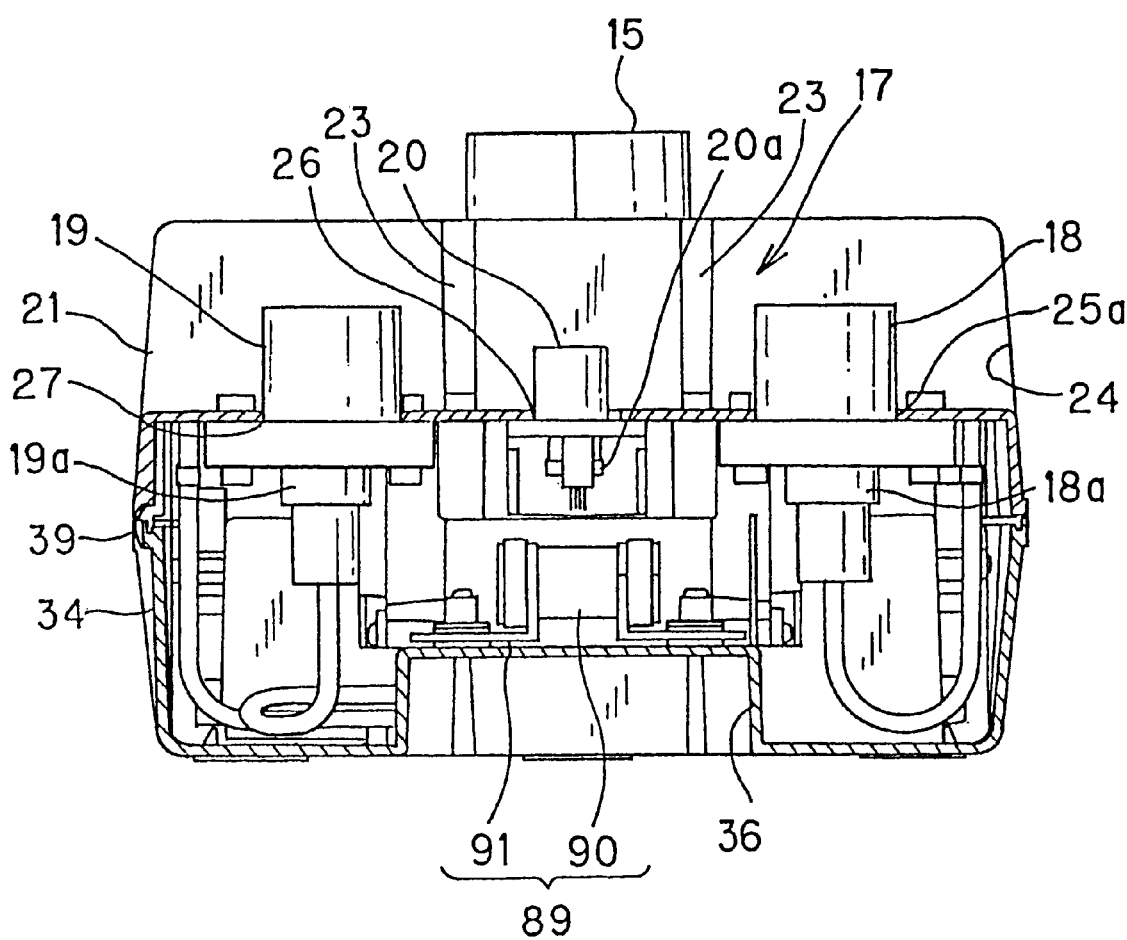
FIG. 5 is a longitudinal cross-sectional view showing a connector of the battery device.
Figure 14:
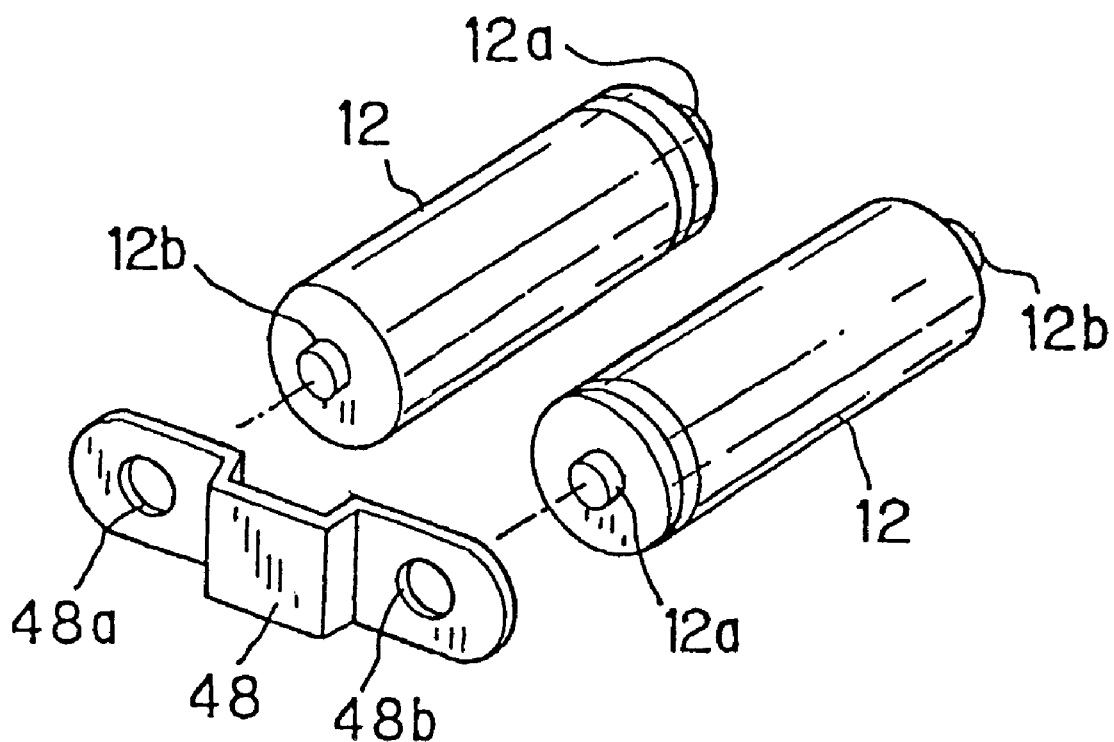
FIG. 14 is a perspective view showing a lithium ion secondary battery and a connecting plate member.

The lithium ion secondary battery 12 is constituted by wrapping an elongated positive electrode material and an elongated negative electrode material in a superposed state and by charging the resulting coil in a cylindrical battery casing charged with the electrolyte. Although not explained in detail, the lithium ion secondary battery 12 is constructed by assembling the positive terminal member connected to the positive electrode material through a gasket to a side of the battery casing, and by connecting a negative terminal material to the battery casing. The lithium ion secondary battery 12 is cylindrically shaped in its entirety, as shown in FIGS. 4 and 14, and has its side and opposite side configured as a positive terminal 12a and as a negative terminal 12b, respectively, with the capacity per each battery 12 being 3 Ah.

With the lithium ion secondary battery 12, a positive electrode active material is applied on a positive terminal collector formed by e.g., an aluminum foil, to constitute the positive electrode material, whilst a negative electrode active material is applied on a negative terminal collector formed by e.g., a copper foil, to constitute the negative electrode material. The positive electrode active material is obtained on mixing polyvinylidene fluoride and n-methyl pyrrolidone as a binder and as a solvent, respectively, to a lithium complex oxide, to form a slurry, and on evenly coating the resulting slurry by e.g., a doctor blade method on the positive terminal collector.

The negative electrode active material is obtained on adding polyvinylidene fluoride and n-methyl pyrrolidone, as a binder and as a solvent, respectively to a carbon material capable of doping and undoping lithium ions, such as graphite, and on evenly applying the resulting slurry to the negative terminal collector using e.g., a doctor blade method. An electrolyte is composed of an electrolytic solution, such as ethylene carbonate, and an electrolyte salt, such as lithium phosphate hexafluoride. Of course, the lithium ion secondary battery 12 may be constituted by a variety of routine known materials other than the above-mentioned materials.

The outer casing member 11 is formed as a hermetically sealed box-like member obtained on combining and interconnecting an upper outer casing half (upper half 21) and a lower outer casing half (lower half 22) paired to the upper half, each of which is molded to a substantially rectangular box shape from a synthetic resin material having superior mechanical strength, superior chemical resistance against lube oil and superior heat resistance. The outer casing member 11 constitutes a hermetically sealed modular casing accommodating space section 11a, obtained on interconnecting the upper half 21 and the lower half 22 at abutting sites through a shield connection structure which will be explained subsequently in detail. Of course, the outer casing member 11 is not limited to this specified structure since it may be constructed by combining and connecting the lid-shaped upper half 21 to the box-shaped lower half 22.

Figure 6:
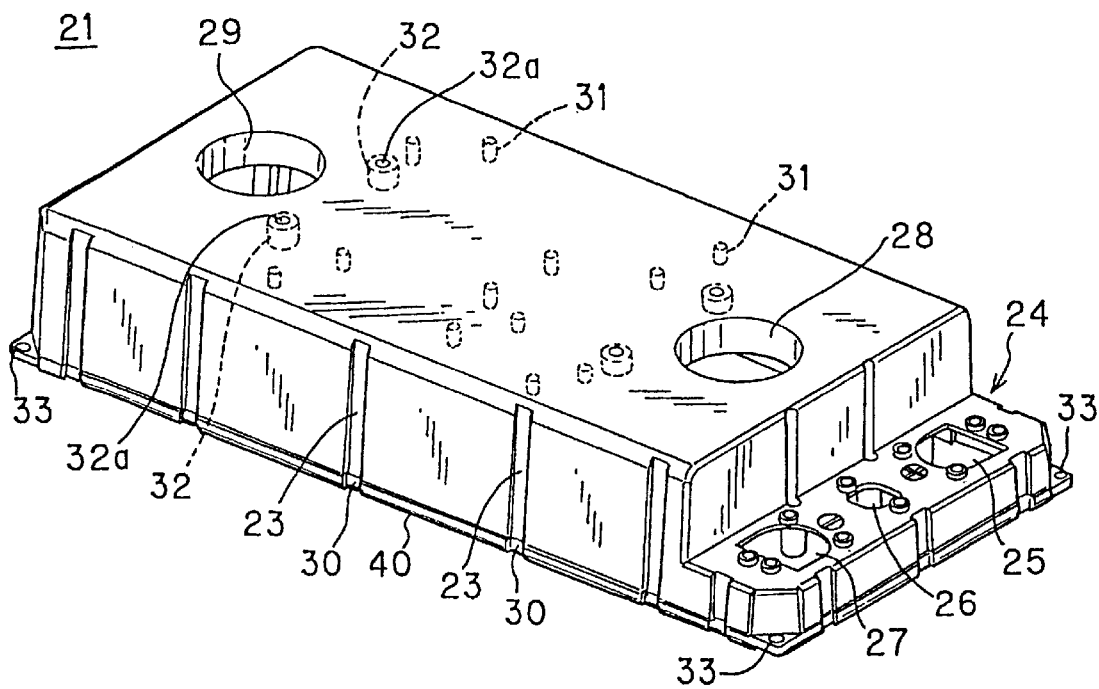
FIG. 6 is a perspective view of the upper half constituting the outer casing member of the battery device.

The upper half 21 is formed in a substantially box shape having its bottom opened, and a large number of engagement guide grooves 23 opening to the upper and bottom surfaces, as shown in FIGS. 2 and 6. The upper half 21 has a non-planar outer peripheral surface by providing these engagement guide grooves 23, thus improving mechanical strength as compared to the case where the upper half 21 presents a planar surface. Moreover, the upper half 21 is thin in thickness and lightweight in its entirety.

The upper half 21 has its lateral side stepped as shown in FIGS. 2 to 6 thus forming a stepped portion 24 in which to mount a connector unit 17 as later explained. The stepped portion 24 is formed with three terminal openings 25 to 27, arrayed in the width-wise direction, in register with the terminals 18 to 20, as shown in FIG. 6. In the first terminal opening 25, there is mounted, in a shielded state, a positive terminal member 18a constituting the positive terminal unit 18. In the center second terminal opening 26, there is mounted, in a shielded state, a transmission/reception connector member 20a, constituting the transmission/reception terminal unit 20 for transmitting/receiving control signals. In the third terminal opening 27, there is mounted, in a shielded state, a negative terminal member 19a constituting the negative terminal unit 19. The upper half 21 has, in its upper surface, a suction duct opening 28 and a discharge duct opening 29 spaced from each other in the longitudinal direction. In the suction duct opening 28 and in the discharge duct opening 29, a suction duct 15 and a discharge duct 16, formed in the modular casing 13, are exposed to outside in a shielded state, as the modular casing 13 is accommodated in the outer casing member 11, obtained on combining the upper half 21 and the lower half 22, as will be explained subsequently.

The upper half 21 is formed as-one with an engagement projection 30 at a lower end of each engagement guide grooves 23 where the upper half 21 compresses against the lower half 22. Each engagement projection 30 is protruded from the bottom of the engagement guide grooves 23 to a height not exposed on the surface of the upper half 21.

On the inner surface of the upper surface of the upper half 21, there are formed a large number of retention ribs 31 for thrusting the cell control units 14, as shown in FIGS. 3, 4 and 6. The retention ribs 31 are provided for thrusting non-symmetrical portions of both side edges of the cell control units 14.

Figure 24:
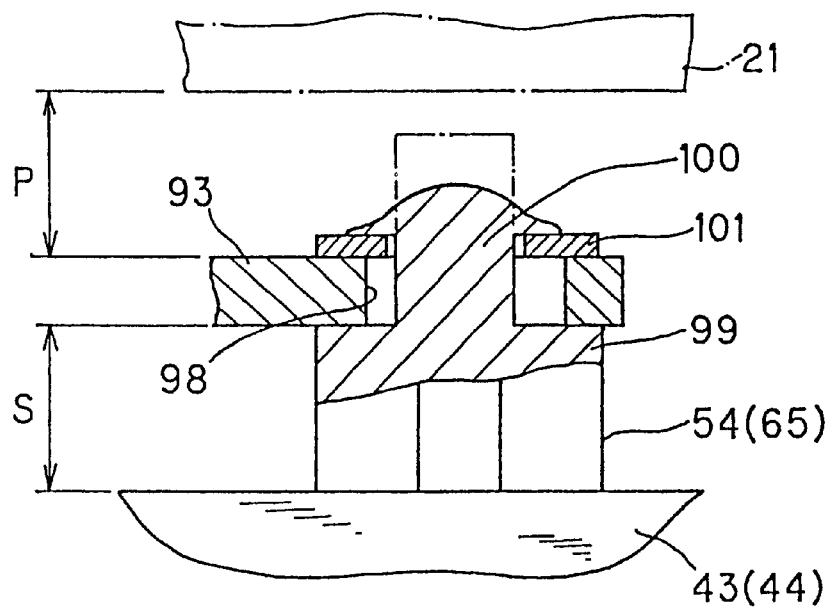
FIG. 24 is a schematic side view for illustrating the mounting structure of the cell control unit, with a portion thereof being broken away.

By having these retention ribs 31, the upper half 21 is able to suppress resonant vibrations of the cell control units 14 due to vibrations or impacts applied to the battery device 10. Also, in the battery device 10, there is defined, by the retention ribs 31, a gap p between the inner surface of the upper half 21 and the cell control units 14, in other words, between the upper half 21 and the modular casing 13, as shown in FIGS. 4 and 24.

The upper half 21 is formed with mounting studs 32 in the vicinity of the suction duct opening 28 and the discharge duct opening 29. The mounting studs 32 are formed with mounting holes 32a opening in the upper surfaces thereof, as shown in FIGS. 2 and 6. In the mounting holes 32a are screwed set screws, as an adhesive 42 is charged therein, to secure the modular casing 13 to the upper half 21. At the four corners of the opening edge of the upper half 21 are formed mounting holes 33, as shown in FIG. 6. In the mounting holes 32a are screwed set screws, as an adhesive 42 is charged therein, to secure the lower half 22 to complete the outer casing member 11.

Figure 7:
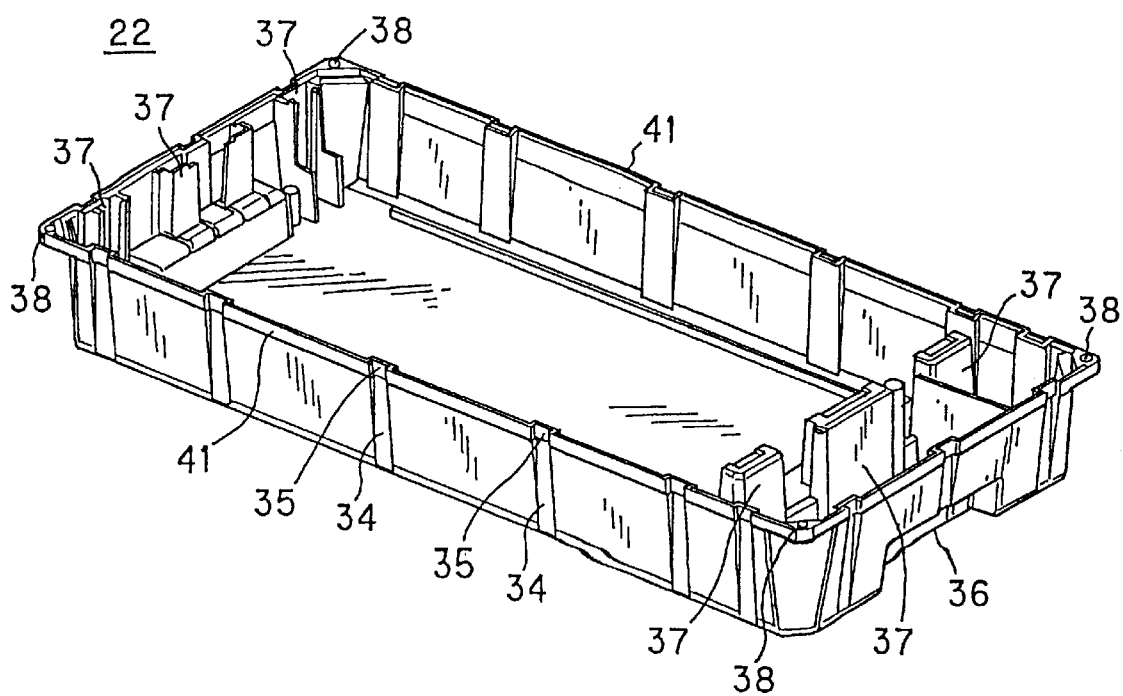
FIG. 7 is a perspective view of a lower half constituting the outer casing member of the battery device.

The lower half 22 is also formed substantially in a box shape having an opened upper surface facing the opened bottom surface of the upper half 21. The lower half 22 is formed in its outer lateral sides with a large number of engagement guide grooves 34 opening in the upper and lower surfaces of the lower half 22, as shown in FIGS. 2 and 7. By providing these engagement guide grooves 34, the lower half 22 has non-planar outer peripheral surfaces, thus improving mechanical strength as compared to the case where the lower half 22 presents a planar surface. When the lower half 22 is combined with the upper half 21, the engagement guide grooves 34 continue to the engagement guide grooves 23 in the upper half 21 to constitute engagement guide grooves extending in the height-wise direction on the outer peripheral surface of the outer casing member 11.

Figure 8:
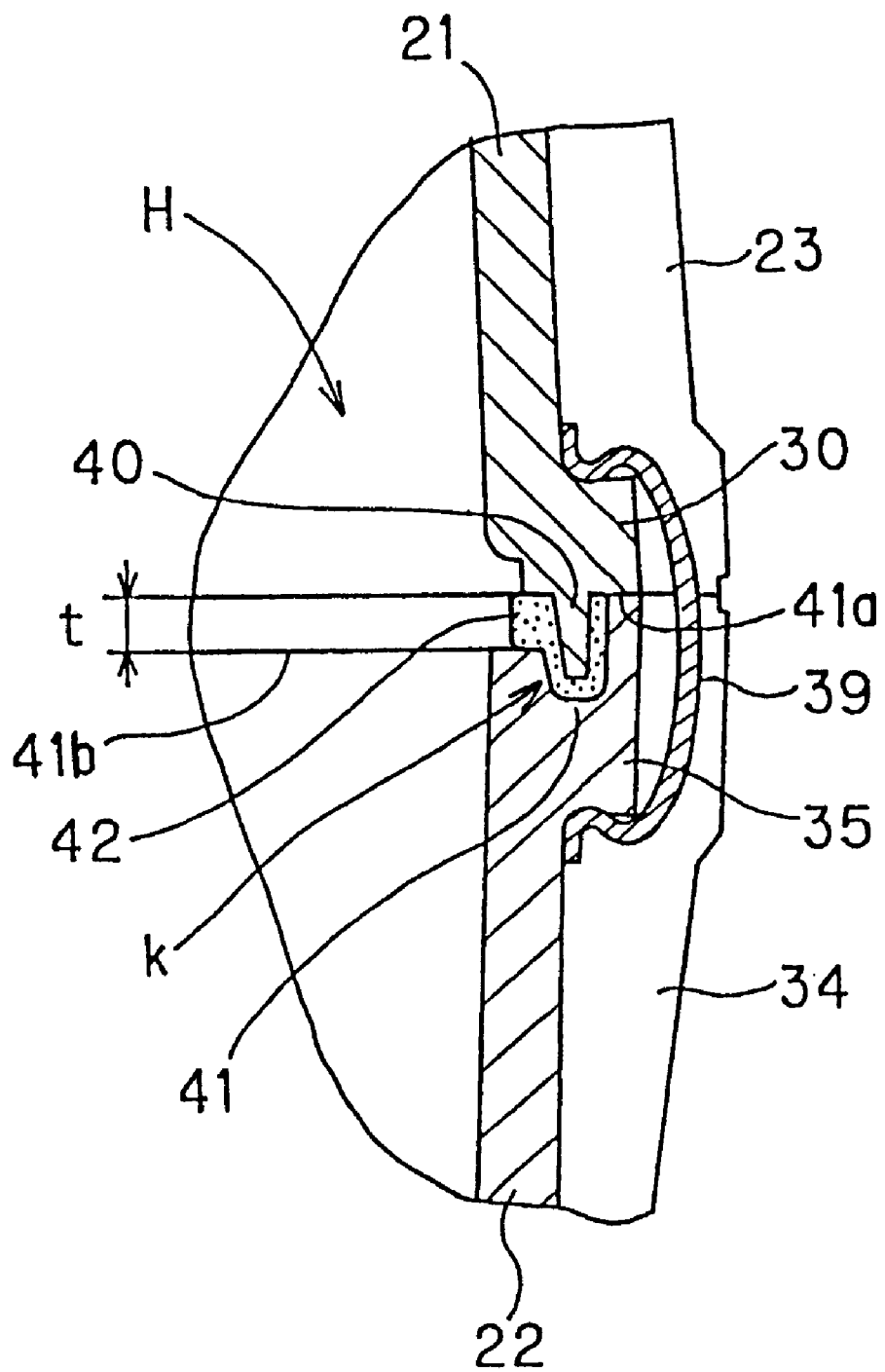
FIG. 8 is a schematic longitudinal cross-sectional view for illustrating the structure of abutting sites of the upper and lower halves constituting the outer casing member of the battery device.

The lower half 22 is formed as-one with engagement projections 35 at the lower ends of the engagement guide grooves 34, in other words, at abutting ends to the upper half 21, as shown in FIG. 8 in detail. The engagement projections 35 are protruded from the bottom of the engagement guide grooves 34 to a height such that the engagement projections 35 are not exposed on the surface of the lower half 22. When the lower half 22 is combined with the upper half 21, the engagement projections 35 compress against the engagement projection 30 of the upper half 21.

The lower half 22 is provided in each longitudinal end thereof with a hand support recess 36 extending from the bottom to the lateral side as shown in FIGS. 2 and 7. These hand support recesses 36 act as a hand support in transporting the battery device 10, whilst acting as a positioning portion in loading the battery device 10 in the battery loading unit 6 of the hybrid system car 1.

The lower half 22 is formed with protuberant mounting ribs 37 on both longitudinal sides for extending upwards from the bottom side, as shown in FIGS. 4 and 7. These mounting ribs 37 compress against the mounting ribs on the upper half 21 as the modular casing 13 is supported as will be explained subsequently. The lower half 22 secures the modular casing 13 in conjunction with the upper half 21 by threading set screws as an adhesive is charged on the mounting ribs 37.

The lower half 22 is formed with mounting holes 38 at four corners of the opening edge, as shown in FIG. 7. The lower half 22 is coupled to the upper half 21 to constitute the outer casing member 11 by threading set screws from the side of the mounting holes 33 of the upper half 21 as the adhesive 42 is charged therein.

The upper half 21 and the lower half 22, constructed as described above, are combined by having the facing opening edges of the bottom and top sides abutted against each other. In the coupled state of the upper half 21 and the lower half 22, the engagement guide grooves 23 and 34, facing each other, are in continuation with one another, whilst the engagement projection 30 and 35 compress against each other. The upper half 21 and the lower half 22 are unified together to complete the outer casing member 11 by the facing engagement projections 30, 35 being clamped by a substantially C-shaped clamper 39 formed of an elastic material, as shown in detail in FIG. 8.

With the engagement projections 30, 35 thus held by the clamper 39, the clamper 39 is positioned in the engagement guide grooves 23, 34, so as not to be exposed to the surfaces of the upper half 21 or the lower half 22, as shown in FIG. 8. Thus, there is no inconvenience such that the clamper 39 is inadvertently caught by an external object and disengaged during transport of the battery device 10, so that a reliable coupling state can be maintained between the upper half 21 and the lower half 22.

The opening edges of the upper half 21 and the lower half 22 are formed by mating crests and recesses of the convexed opening edge 40 and the recessed opening edge 41, engaging with each other, as shown in FIG. 8. That is, the convexed opening edge 40 of the upper half 21 has its mid portion along its thickness convexed as shown. The convexed opening edge 40 has an outer side extending substantially vertically, whilst having its inner side inclined so that the thickness of the convexed opening edge 40 will be progressively increased in the height-wise direction.

On the other hand, the concave opening edge 41 of the lower half 22 has its mid portion along the thickness recessed with the width of the groove being slightly larger than the thickness of the opening edge 40 of the upper half 21. The concave opening edge 41 has an outer side extending substantially vertically, whilst having its inner side inclined so that the thickness of the concave opening edge 41 will be progressively increased in the height-wise direction. The concave opening edge 41 has an outer opening edge 41a and an inner opening edge 41b. The inner opening edge 41b is contiguous to the recess and is at a slightly lower level to define a gap t between it and the covexed opening edge 40 of the upper half 21. The upper half 21 and the lower half 22 are combined together by having the convexed wall section of the convexed opening edge 40 engaged in the concave recess of the concave opening edge 41, with an adhesive 42 having been charged into the concave groove in the concave opening edge 41, as will be explained subsequently. The convexed opening edge 40 and the concave opening edge 41 are combined so that a gap k is formed therebetween for extending upwards, as shown in FIG. 8. The adhesive 42 is caused to partially overflow through the gap t of the concave opening edge 41 by the convexed opening edge 40 being thrust within the concave opening edge 41.

That is, by the above-described configuration of the convexed opening edge 40 and the concave opening edge 41, the adhesive 42 is extruded towards the inner gap k as shown so that the adhesive is caused to overflow through the gap k towards the insides of the upper half 21 and the lower half 22. Thus, the adhesive is prevented from overflowing onto the surface side to maintain the appearance of the upper and lower halves 21, 22. The coupling portions are secured fixedly such that the outer casing member 11 is constituted as extremely high air tightness is maintained.

As the adhesive, an urethane-composite adhesive agent is used which is able to maintain high elasticity even under a cured state. Specifically, the adhesive 42 used may be an urethane-composite adhesive agent manufactured by YOKOHARA GOMU KK under the trade name of "JSK-105." This adhesive "JSK-105" is mainly composed of a urethane prepolymer, and has a tack-free time of 30 minutes at 20° C., a viscosity of 60,000 ps, a bonding strength in terms of a shearing bonding strength of 41 $kgf/cm^2$, a cross-lap of 20 $kgf/cm^2$, dumbbell physical properties of 40, a maximum tensile stress of 50 $kgf/cm^2$ and a maximum elongation of 600%.

Meanwhile, the adhesive 42 is used not only at a connecting site between the convexed opening edge 40 and the concave opening edge 41 but also in the connecting site of various portions of the battery device 10. The adhesive 42 is not limited to the above-mentioned urethane-composite adhesive agent but may also be a silicone-composite adhesive agent or a modified silicone-composite adhesive agent having properties similar to those of the urethane-composite adhesive agent.

With the outer casing member 11, the upper half 21 and the lower half 22 are bonded to each other along the entire periphery by bonding the convexed opening edge 40 and the concave opening edge 41 at the abutting sites using the adhesive 42 having the above-mentioned properties, whereby the bonding state between the upper half 21 and the lower half 22 may be reliably maintained by the sufficient bonding power and the buffering action brought about by elasticity even if strong vibrations or shock are applied as a result of the car running. That is, the outer casing member 11 is constituted to maintain air-tightness of the inner space section 11a.

Figure 9:
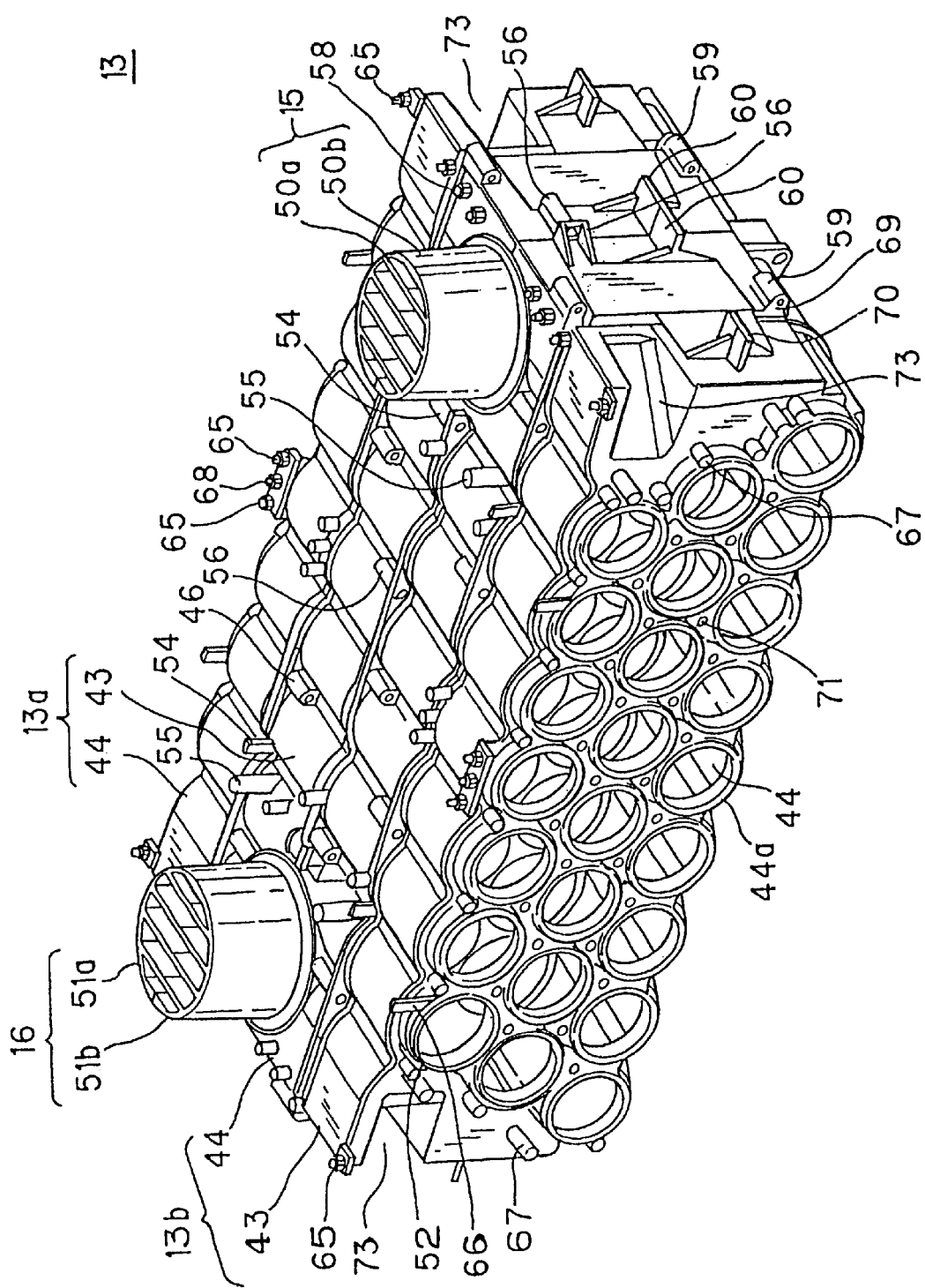
FIG. 9 is a perspective view for illustrating the structure of a modular casing housed in the outer casing member of the battery device.

In the outer casing member 11, constructed as described above, the paired modular casings 13a, 13b are housed in the modular casing accommodating space section 11a by set screws and the adhesive 42 on the mounting ribs 37 of the lower half 22 through the upper half 21. The modular casing 13 is constituted by paired unit modular casings 13a, 13b in parallel with each other, as shown in FIG. 9, as explained subsequently in detail. The modular casing 13 is molded from a synthetic resin material, exhibiting mechanical strength, resistance against chemicals or heat resistance, such as polybutylene terephthalate resin. Among other synthetic resin materials, there are, for example, an acrylonitrile butadiene styrene resin, a polyamide resin, a propylene resin and a polycarbonate resin.

The modular casing 13 is combined from two casing halves, namely an inner modular casing half (inner casing half 43) and an outer modular casing half (outer casing half 44) as shown in FIG. 9. The inner casing half 43 and the outer casing half 44 are in the form of a substantially transversely elongated box opened in facing lateral sides. The inner casing half 43 and the outer casing half 44 are superposed in the width-wise direction and combined together with the opened lateral sides 43a, 44a as junction surfaces to constitute the modular casing 13 having the transversely elongated box shape.

The modular casing 13 is formed as a rectangular block having an outer profile substantially equal to that of the modular casing accommodating space section 11a except the stepped portion 24. When the inner casing half 43 is combined with the outer casing half 44, there is defined in each modular casing 13 a battery housing section 45 for accommodating 24 lithium ion secondary batteries 12. The inner casing half 43 and the outer casing half 44 of the modular casing 13 of the modular casing 13 are each of a width-wise size slightly smaller than one-half the length of the lithium ion secondary battery 12 so that the modular casing 13 is of approximately equal size as the length of the main body portion of the lithium ion secondary battery 12.

Referring to FIG. 4, a sum total of 24 lithium ion secondary batteries 12 are accommodated in the battery housing section 45 in the modular casing 13 in three tiers in each of which plural lithium ion secondary batteries 12 are arrayed side-by-side. Specifically, 7 lithium ion secondary batteries 12 are arrayed in the upper tier, 8 lithium ion secondary batteries 12 are arrayed in the mid tier and 9 lithium ion secondary batteries are arrayed in the lower tier in the battery housing section 45. The lithium ion secondary batteries are arrayed so that the longitudinal directions thereof are arrayed in the same direction. It is noted that the set of the lithium ion secondary batteries of the upper row is housed with an offset equal to one-half the radius of the battery with respect to that of the mid row, and that the set of the lithium ion secondary batteries of the lower row is housed with an offset equal to one-half the radius of the battery with respect to that of the mid row.

Thus, the modular casing 13 has, in the inside of the battery housing section 45, the lithium ion secondary batteries 12 of the upper row in vertical alignment with those of the lower row. The outer peripheries of the lithium ion secondary batteries 12 of the upper and lower rows are partially overlapped with those of the mid row. The modular casing 13 houses the 24 lithium ion secondary batteries 12 in a staggered relationship in an upper row, a mid row and a lower row in a trapezoidal area in its entirety, as shown in FIG. 4.

By having the lithium ion secondary batteries 12 housed in this manner in the battery housing section 45 in the modular casing 13, it is possible to improve the inner spatial efficiency and to maintain a flow duct for the cooling air stream. Of course, the modular casing 13 is not limited to the above-described configuration of housing the 24 lithium ion secondary batteries in the staggered relationship as described above.

In the modular casing 13, the positive terminals 12a and the negative terminals 12b of the lithium ion secondary batteries 12 accommodated in the battery housing section 45 are exposed to outside through a terminal opening 46 formed in the lateral side 43b of the inner casing half 43 and through a terminal opening 47 formed in the lateral side 44b of the outer casing half 44, respectively, as shown in FIG. 4. In the modular casing 13, the paired terminal openings 46, 47 of the inner and outer casing halves 43, 44 are axially aligned with each other. The opening diameters of the terminal openings 46, 47 are smaller than the outside diameter of the main body portion of the lithium ion secondary battery 12, while being larger than the outside diameter of the positive terminal 12a or the negative terminal 12b.

In the modular casing 13, after the lithium ion secondary batteries 12 are accommodated in the battery housing section 45, both ends of the lithium ion secondary batteries are cemented in position to the terminal openings 46, 47. In the modular casing 13, the lithium ion secondary batteries 12 are housed in the battery housing section 45 so that the positive terminals 12a and the negative terminals 12b are alternatively exposed to outside through the neighboring terminal openings 46, 47.

The 24 lithium ion secondary batteries 12 are aligned, using an assembling jig, not shown, so that the positive terminals 12a and the negative terminals 12b are positioned in alternation with each other and, in this state, the lithium ion secondary batteries 12 are collectively loaded into the inside of the battery housing section 45 from e.g., the opened lateral side 43a of the inner casing half 43. Each lithium ion secondary battery 12 has the end of the main body portion thereof retained by the inner peripheral wall section 46a and has the positive terminal 12a or the negative terminal 12b exposed to outside through the terminal opening 46, as mentioned above.

When the outer casing half 44 is combined with the inner casing half 43, each lithium ion secondary battery has its opposite side negative terminal 12b or positive terminal 12a exposed to outside through the terminal opening 47 of the outer casing half 44. Each lithium ion secondary battery 12 has the end of the main body portion thereof retained by the inner peripheral wall 47a of the terminal opening 47. The vertically or transversely neighboring positive and negative terminals 12a, 12b of the lithium ion secondary batteries 12 are interconnected by a connection plate member 48 shown in FIGS. 4 and 14. Thus, 24 of the lithium ion secondary batteries 12, housed in the modular casing 13, are connected in series with one another.

The connection plate member 48, formed by a rectangular copper plate, is bent to a substantially cranked cross-sectional shape and is plated with nickel. The connection plate member 48 is formed in its both sides with terminal fitting openings 48a, 48b slightly larger than the outside diameter of the positive terminal 12a or the negative terminal 12b. Into the terminal fitting openings 48a, 48b of the connection plate member 48 are fitted the positive terminal 12a or the negative terminal 12b, which are then spot-welded in position. The connection plate member 48 interconnects the lithium ion secondary batteries 12 in series with each other.

In the set of the 24 lithium ion secondary batteries 12, accommodated in the battery housing section 45, the lithium ion secondary battery 12A, arrayed leftmost in the lower row, and the lithium ion secondary battery 12B, arrayed rightmost in the lower row, represent both end batteries of the series-connected battery set. The lithium ion secondary battery 12A has its positive terminal 12a exposed at the terminal opening 47 and assembled to the connection plate member 48 having a wedge-shaped outer profile.

In the upper surface of the modular casing 13, there are formed the suction duct 15 and the exhaust duct 16 for taking air inside the car and for exhausting the air to outside, respectively. In the modular casing 13, the cooling air is routed to a suction unit, not shown, from the suction duct 15 into the inside of the battery housing section 45 and exhausted through the exhaust duct 16 to an exhaust unit, not shown. By having the lithium ion secondary batteries 12 arranged in a staggered relationship in the battery housing section 45 as described above, the flow path or the cooling air is maintained to effect efficient interior cooling.

Figure 10:
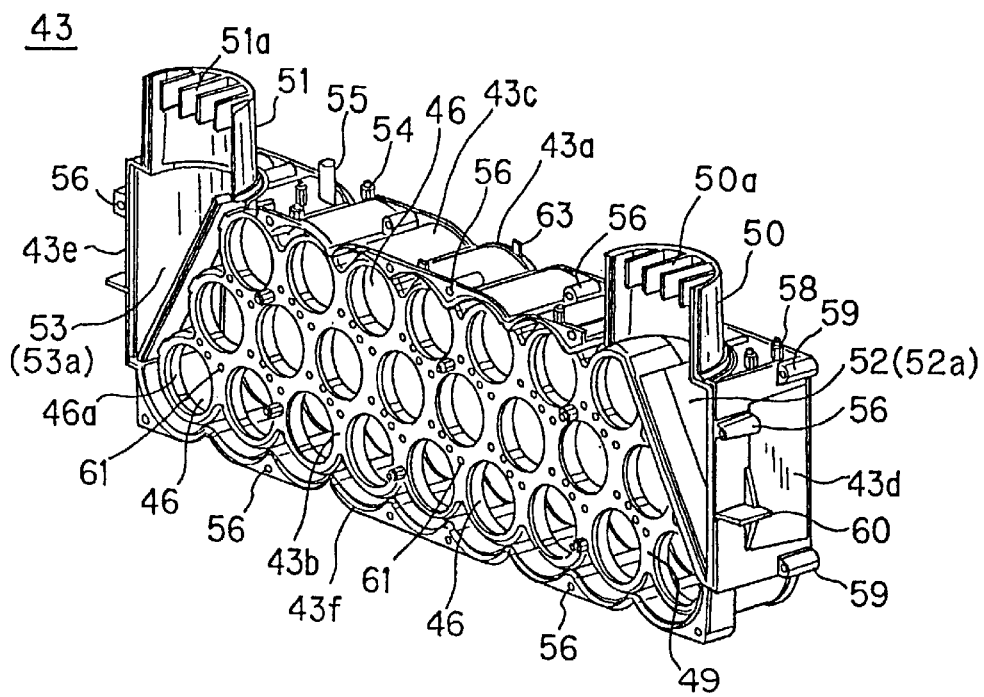
FIG. 10 is a perspective view of an inner casing half of the modular casing looking from a connecting surface.
Figure 11:
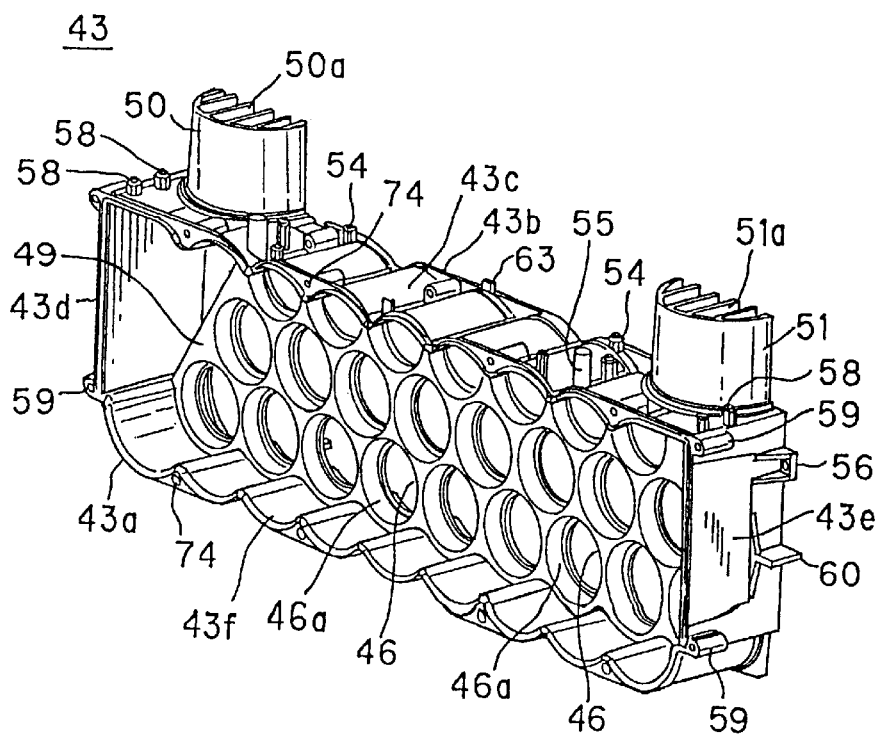
FIG. 11 is a perspective view of the inner casing half looking from the battery housing section.

The inner casing half 43 constituting the modular casing 13 is explained in detail by referring to FIGS. 10 and 11. The inner casing half 43 has a width equal to approximately one-half the length of the lithium ion secondary battery 12 and a substantially trapezoidally-shaped battery housing half section 49 constituting a one-half section of the battery housing section 45 is formed as a recessed opening in the opened lateral side 43a shown in FIG. 11. The aforementioned 24 terminal openings 46 are formed in the inner casing half 43, shown in FIG. 10, for communicating with the battery housing section 45.

The inner casing half 43 has its upper surface 43c formed as-one with semi-cylindrical duct halves 50, 51 spaced apart from each other in the longitudinal direction. When the unit modular casings 13a, 13b are combined together, the duct halves 50, 51 make up the cylindrical suction duct 15 and the cylindrical exhaust duct 16. On the opening edges of the duct halves 50, 51 are formed radially extending plural reinforcement ribs 50a, 51a. The inner casing half 43 is formed with duct space half sections 52, 53 communicating with the lower portions of the duct halves 50, 51, as shown in FIG. 10. The duct space half sections 52, 53 are of a cross-sectional shape of a right-angled triangle having its acute-angle apex directed downwards.

The inner casing half 43 has its inner surface 43c formed as-one with a large number of fitting weld portions 54 for cementing the four corners of the cell control units 14 in a manner as will be explained subsequently in detail. The inner casing half 43 has its upper surface 43c formed with plural tubular half mounting sections 55 in register with the mounting studs 32 of the upper half 21. The inner casing half 43 is mounted on the upper half 21 by having a set screw mounted through the half mounting sections 55 through an adhesive, as described above.

The upper surface 43c and both lateral sides 43d, 43e of the inner casing half 43 are provided with a large number of sheet mounting tubes for mounting an insulating sheet, not shown, adapted for covering the lateral sides of the modular casing 13. The inner casing half 43 is formed with a large number of connection portions 56, comprised of connecting openings or connecting tubes for coupling to the counterpart inner casing half 43. These connection portions 56 are formed in perimetral portions of the terminal opening 46 in the lateral side 43b or in both lateral sides 43d, 43e.

The inner casing half 43 is formed with plural clamper mounting portions 58 for mounting a cord clamper 57. The inner casing half 43 has its longitudinal lateral sides formed as-one with plural connection tubes 59 for coupling to the outer casing half 44 as later explained and with a flange projection 60 adapted to be set on the mounting ribs 37 of the outer casing member 11, although these portions are not shown in detail. Around the terminal opening 46 of the lateral side 43b of the inner casing half 43 are formed plural clamper mounting openings 61, by means of which the cord clamper 57 or an adapter member 62 is mounted on the inner casing half 43.

The inner casing half 43 has its upper surface 43c formed with plural retention ribs 63 adapted for supporting the bottom surface of the cell control units 14 in register with the retention ribs 31 formed on the upper half 21. The retention ribs 63 define a gap s between the ribs 63 and the upper surface 43c of the inner casing half 43 through the fitting weld portions 54, as later explained, as shown in FIGS. 4 and 24.

The inner casing half 43 is combined with the paired unit modular casings 13a, 13b by combining the lateral side 43b shown in FIG. 10 with the counterpart inner casing half 43. The inner casing half 43 is abutted against the counterpart inner casing half 43 in a position rotated 180° relative to each other. The two inner casing halves 43 then are coupled together by set screws in a state in which an adhesive is applied to the facing coupling portions 56.

In the inner casing half 43, the inner surfaces of the upper surface 43b or the bottom surface 43f constituting the battery housing half section 49 are formed arcuately to conform to the terminal openings 46. When the inner casing half 43 is coupled to the outer casing half 44 to constitute the modular casing 13, with the lithium ion secondary batteries 12 being then housed in the battery housing section 45, there is formed a gap between the outer periphery of the lithium ion secondary batteries 12 arrayed on the outer periphery and the inner surface of the upper surface 43b and the bottom surface 43f.

The pair inner casing halves 43 are interengaged by the crest and recess connection by the rim of the battery housing half section 49 on the lateral surface 43b and the rim of the duct space half sections 52, 53 having the crests and mating recesses when the rims compress against each other in a manner not shown in detail. Thus, the coupled state of the paired inner casing halves 43 is positively maintained even on application of external forces, such as vibrations.

The paired inner casing halves 43 constitute the tubular suction duct 15 and the similarly tubular exhaust duct 16 by the facing duct halves 50, 51 compressing against each other in the coupled state. When the modular casing 13 is housed in the outer casing member 11, as described above, the suction duct 15 and the exhaust duct 16 are exposed to outside through the suction duct opening 28 and the discharge duct opening 29 formed in the upper half 21.

When the first and second unit modular casings 13a, 13b are combined together by abutting the facing junction surfaces 43a to each other, the duct space half sections 52, 53 are abutted to each other to constitute duct space sections 52a, 53a communicating with the suction duct 15 and the exhaust duct 16. The duct space sections 52a, 53a are positioned on both sides of the battery housing section 45 between the paired junction lateral sides 43a, 43a of the paired inner casing halves 43.

If, in the inner casing halves 43, the first and second unit modular casings 13a, 13b are combined together as described above, a set of the cooling air suction structure and the cooling air exhaust structure is constituted, so that, with the inner casing halves 43, it is possible to simplify and reduce the size of the modular casing 13 to reduce the size of the entire battery device 10 as well as to realize efficient cooling of the lithium ion secondary batteries 12 housed in the battery housing section 45.

Figure 12:
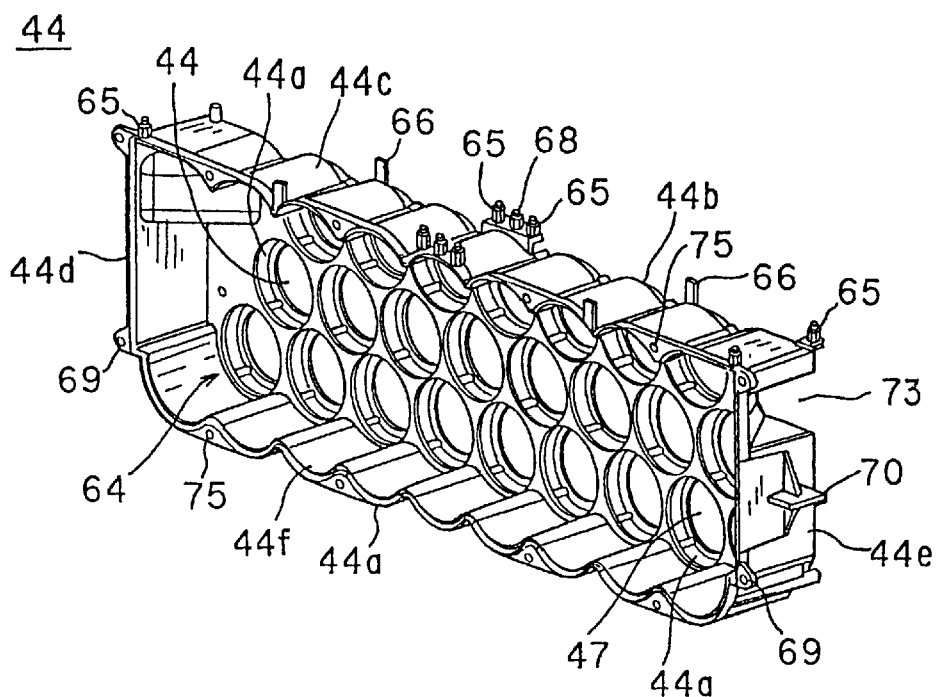
FIG. 12 is a perspective view of an outer casing half of the modular casing looking from the battery housing section.
Figure 13:
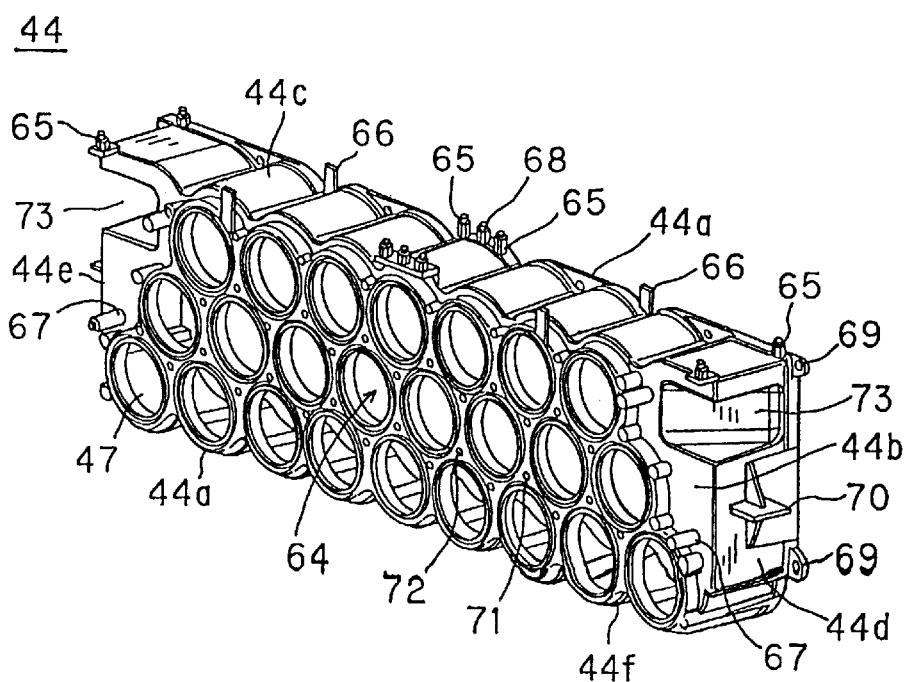
FIG. 13 is a perspective view of an outer casing half looking from an outer side.

Referring to FIGS. 12 and 13, the outer casing half 44 constituting the above-described modular casing 13 is explained in detail. The outer casing half 44 has a width approximately one-half the length of the lithium ion secondary battery 12 and is formed with a substantially trapezoidally-shaped recessed battery housing half section 64 opened in the opened lateral side 44a to constitute the half section of the battery housing section 45, as shown in FIG. 12. The outer lateral side 44b of the outer casing half 44 is formed with the above-mentioned 24 terminal openings 47 communicating with the recessed battery housing half section 64 as shown in FIG. 13. The terminal openings 47 are arrayed in a staggered relationship, when the outer casing half 44 and the inner casing half 43 are combined together, as later explained, so that the terminal openings 47 are axially aligned with the associated terminal openings 46.

The outer casing half 44 is formed as-one with a large number of fitting weld portions 65 for securing the four corners of the cell control units 14 to the upper surface 44c, as shown in FIGS. 12 and 13. The upper surface 44c of the outer casing half 44 is formed with plural retention ribs 66 for supporting the bottom of the cell control units 14 in association with the retention ribs 31 formed on the upper half 21. Similarly to the retention ribs 63 formed on the inner casing half 43, the retention ribs 66 define a gap s between the upper surface 44c of the outer casing half 44 and the cell control units 14 mounted on the upper surface 44c through the fitting weld portions 65, as will be explained subsequently.

On the lateral side 44b of the outer casing half 44 are formed plural sheet mounting tubular portions 67 for mounting an insulating sheet, not shown, adapted for sheathing the lateral side of the modular casing 13. On the upper surface 44c of the outer casing half 44 is formed a clamper mounting portion 68 for mounting the cord clamper 57. The outer casing half 44 is formed as-one with plural coupling crests 69 for coupling to the inner casing half 43 and a flange projection 70 adapted for being set in position on the mounting ribs 37 of the outer casing member 11, in a manner as explained subsequently.

The outer casing half 44 is formed with mounting holes 71 around the terminal openings 47 formed in the lateral side 44b. The cord clamper 57 and the adapter member 62 as later explained are mounted in these mounting holes 71 in the outer casing half 44. Around the terminal opening 47 of the outer casing half 44 are formed diametrically opposite adhesive charging openings 72, as will be explained subsequently in detail.

Each adhesive charging opening 72 communicates from the inner peripheral wall section 47a to the terminal opening 47, however, it is formed as a bottomed hole not communicating to the battery housing half section 64. In both lateral surfaces 44d, 44e of the outer casing half 44 are formed recesses 73 opening in the lateral side 44b. These recesses 73 provide a flow duct for the cooling air between the modular casing 13 and the outer casing member 11, while operating as a hand support in handling the modular casing 13 and as a wiring guide.

The outer casing half 44 is formed with an upper surface 44b and a bottom surface 44f, the inner surfaces of which define arcuate sections to mate with the terminal openings 47, as shown in FIG. 12. When the outer casing half 44 is combined with the inner casing half 43 to form the modular casing 13 and the lithium ion secondary batteries 12 are accommodated in the battery housing section 45, there is defined a gap between the outer periphery of the lithium ion secondary batteries 12 and the inner arcuate surface sections of the upper surface 44b or the bottom surface 44f of the lithium ion secondary batteries 12.

The outer casing half 44, constructed as described above, is abutted to and combined with the opened lateral surface 43a of the inner casing half 43, with the opened lateral surface 44a as a coupling surface, to constitute unit modular casings 13a, 13b shown in FIG. 9. The inner casing half 43 and the outer casing half 44 are coupled together by having set screws, not shown, threadedly engaged in coupling tapped holes 74, 75 formed in register with each other in the rim of the opening sides 43a, 44a or in coupling tapped holes formed in the coupling tube 59 and in the coupling crest 69. An adhesive 42 is charged into the coupling tapped holes 74, 75 before threading the set screws.

The paired unit modular casings 13a, 13b are abutted to each other, with the lateral sides 43b of the inner casing halves 43 as the junction surface, to constitute the modular casing 13 shown in FIG. 9. In the modular casing 13, the duct halves 50, 51 of the respective inner casing halves 43 are abutted to each other as described above, to constitute the suction duct 15 and the exhaust duct 16. It is noted that 24 lithium ion secondary batteries 12 are accommodated in the battery housing section 45, using the assembling jig as described above, when the inner casing half 43 and the outer casing half 44 are combined to each other to constitute the modular casing 13.

That is, the lithium ion secondary batteries 12 are accommodated in the battery housing half section 49 through the opening lateral side 43a of the inner casing half 43 of the modular casing 13. The positive terminal 12a and the negative terminal 12b of each lithium ion secondary battery 12 are alternately exposed to outside through the terminal openings 46 of the inner casing half 43 of the modular casing 13 in a manner as described above. In the modular casing 13, the outer casing half 44 is coupled in this state to the inner casing half 43. In the modular casing 13, the positive terminals 12a and the negative terminals 12b of the lithium ion secondary batteries 12 are alternately exposed to outside through the terminal openings 47 of the outer casing half 44.

In the modular casing 13, the outer periphery of the lithium ion secondary batteries 12, the positive terminals 12a and the negative terminals 12b of which are exposed to outside, are cemented in the respective terminal openings 47 of the outer casing half 44 by an adhesive 76 charged into adhesive charging openings 72. To this end, the peripheral sites of the terminal openings 47 are constructed by a detailed structure shown in FIGS. 15 to 17.

The adhesive 76 may be the adhesive 42 used for coupling e.g., the upper half 21 and the lower half 22 as described above. The adhesive 76 cements the outer casing half 44 and the lithium ion secondary battery 12 to each other with sufficient adhesion, whilst operating for buffering against an external force, such as vibrations.

That is, the outer casing half 44 has 24 holding tubular portions 77 protruded slightly above the lateral surface 44b. The terminal openings 47 are bored in these holding tubular portions 77. In the holding tubular portion 77, the adhesive charging openings 72 are formed in diametrically opposite positions as bottomed holes not communicating with the battery housing half section 64. In addition, each adhesive charging opening 72 has its inner peripheral wall section cut out to communicate with the terminal opening 47 to constitute an adhesive efflux opening 78, as shown in FIGS. 15 to 17.

In the adhesive charging openings 72, a nozzle of a pressure delivery pump, not shown, is introduced to charge the adhesive 76 into its inside. Since the adhesive charging openings 72 are formed as blind holes, an excess amount of the adhesive 76 is caused to overflow the adhesive efflux opening 78 from the terminal opening 47. Therefore, the battery device 10 detects this state to verify that a pre-set amount of the adhesive has been charged into the inside of the adhesive charging openings 72 to permit facilitated control of the charging quantity of the adhesive 72.

Figure 15:
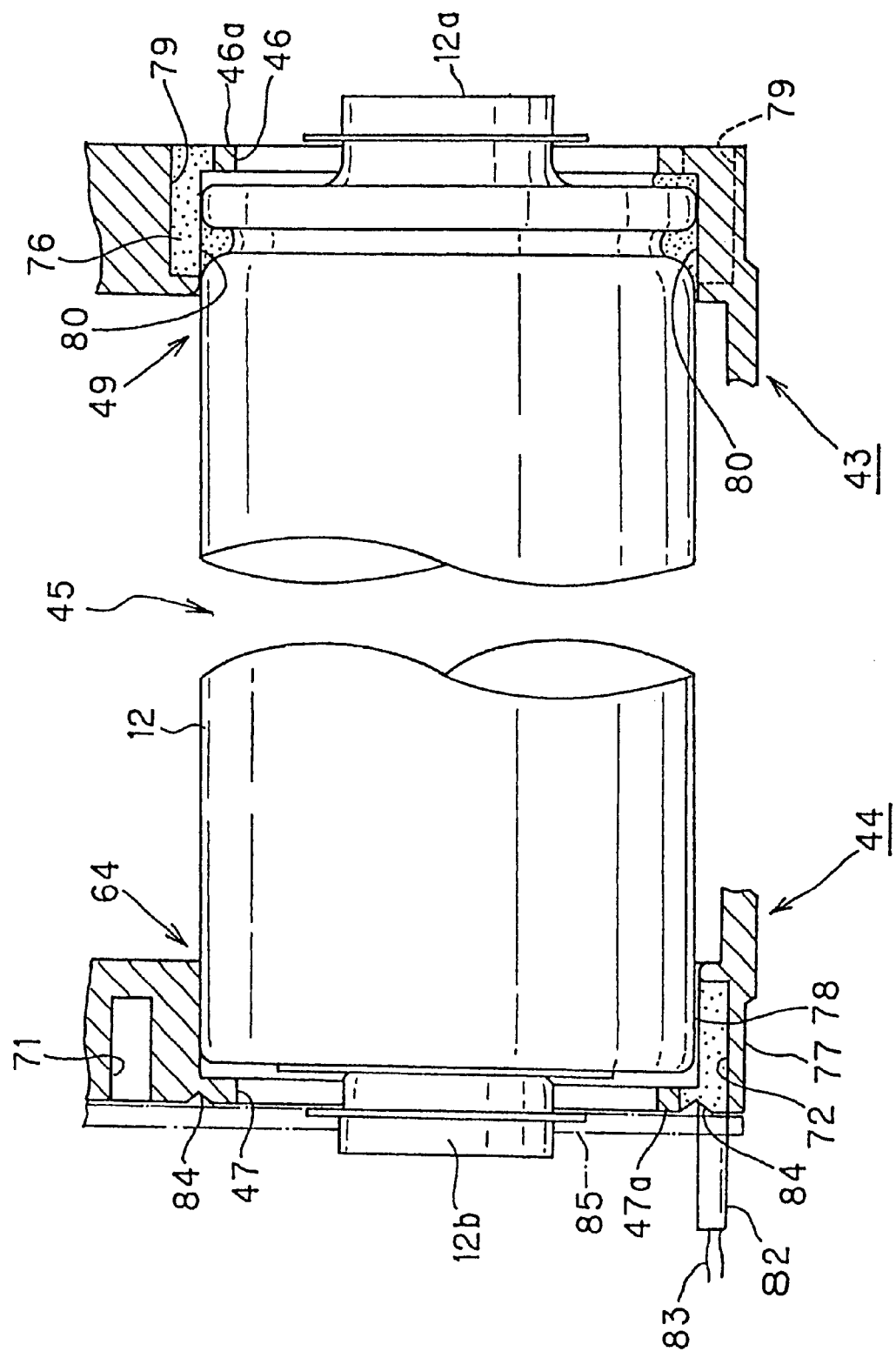
FIG. 15 is a schematic longitudinal cross-sectional view for illustrating the housed state of the lithium ion secondary battery in the battery housing section of the modular casing.
Figure 16:
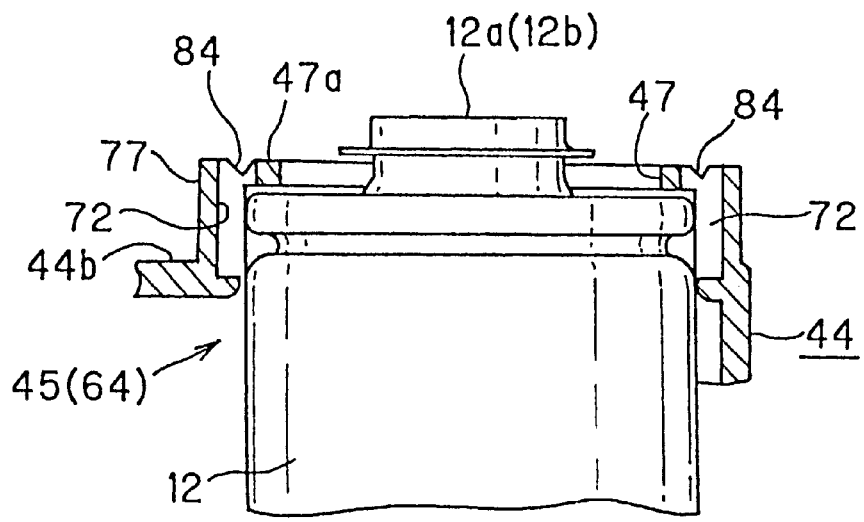
FIG. 16 is a schematic longitudinal cross-sectional view showing the state in which a lithium ion secondary battery is accommodated in the battery housing section in the modular casing.
Figure 17:
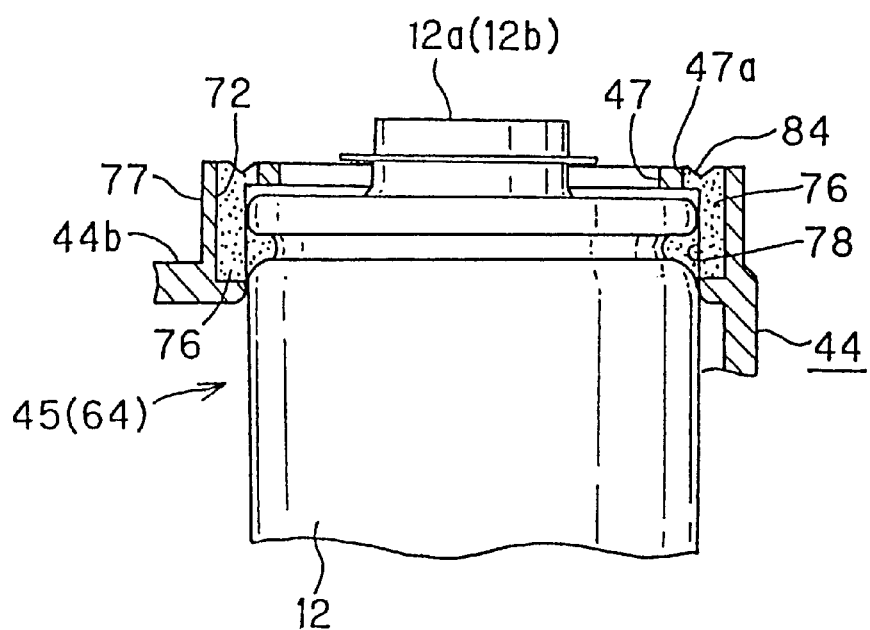
FIG. 17 is a schematic longitudinal cross-sectional view showing the state in which a lithium ion secondary battery is cemented in position in the battery housing section in the modular casing with an adhesive.

When the adhesive 76 is charged through the adhesive charging openings 72, it is allowed to overflow the adhesive efflux opening 78 to flow into the inside of the battery housing half section 64 so as to be affixed to substantially the entire periphery of the lithium ion secondary battery 12, as shown in FIGS. 15 and 17. The adhesive 76 is cured in this state to cement the outer periphery of the lithium ion secondary battery 12 to the inner peripheral wall of the holding tubular portions 77.

In the modular casing 13, adhesive charging openings 79 are formed around the terminal openings 46 in the inner casing half 43, as shown in FIG. 15, so that the adhesive 76 is charged into these adhesive charging openings 79. The adhesive 76 flows out from an adhesive efflux portion 80 into the inside of the battery housing half section 49 to become attached to substantially the entire periphery of the lithium ion secondary batteries 12, as shown in FIG. 15. The adhesive 76 is cured in this state to secure the outer periphery of the lithium ion secondary batteries 12 to the inner periphery 46a of the terminal opening 46.

In the battery device 10, only both outer peripheral ends of the main body portion of each of the lithium ion secondary batteries 12 are cemented in position on the inner peripheral wall sections 46a, 47a of the respective terminal openings 46, 47 in the battery device 10. The lithium ion secondary batteries 12 are accommodated in the battery housing section 45 in a state in which sites other than the end extremities of the batteries are in the floated state. Thus, even though vibrations or shocks are applied with the running of the hybrid system car 1, the lithium ion secondary batteries 12 are housed in a stable state in the battery housing section 45 without the neighboring lithium ion secondary batteries 12 colliding against one another.

In the battery device 10, the lithium ion secondary batteries 12 are housed in a staggered relationship in the battery housing section 45 of the modular casing 13 as a gap is maintained between the outer peripheral sides of the batteries or between the inner peripheral surfaces of the inner casing half 43 or the outer casing half 44 and the outer peripheral sides of the batteries. Thus, with the battery device 10, not only is the spatial efficiency maintained, but also the lithium ion secondary batteries 12 are cooled efficiently since an even flow duct for the cooling air in the battery housing section 45 can be maintained. Of course, the modular casing 13 is not limited to the above-described configuration in which the 24 lithium ion secondary batteries 12 are arranged in a staggered fashion.

In the battery device 10, a set of a cooling air suction structure and a cooling air exhaust structure, cooperating with each other, is formed in the first and second unit modular casings 13a, 13b, combined together as described above. Thus, in the battery device 10, in which the modular casing 13 is simplified in structure and reduced in size, the overall size of the battery device may be reduced, whilst the lithium ion secondary batteries 12, housed in the battery housing section 45, can be cooled efficiently.

That is, in the battery device 10, the cooling air supplied from the suction duct 15 is evenly distributed to the first and second unit modular casings 13a, 13b through a distribution spatial section 52a formed below the suction duct 15. In the battery device 10, the cooling air which has traversed the inside of the battery housing sections 45 in the first and second unit modular casings 13a, 13b is exhausted through the duct space section 53a from the exhaust duct 16. In the battery device 10, the lithium ion secondary batteries 12, housed in the first and second unit modular casings 13a, 13b, can be cooled uniformly, whilst pressure loss of the cooling air is reduced to assure efficient cooling.

In the battery device 10, the lithium ion secondary batteries 12 are arrayed in a staggered relationship in the battery housing section 45 of the modular casing 13 to constitute a flow passage for the cooling air between the neighboring batteries. In the battery device 10, the upper surfaces 43b, 44b and the bottom surfaces 43f, 44f of the inner casing half 43 and the outer casing half 44, making up the modular casing 13, are each formed with plural arcuate sections. Also, in the battery device 10, a gap similar to that provided between the outer peripheral surfaces of the lithium ion secondary batteries 12 is formed between the outer peripheral surface of the outer row of the lithium ion secondary batteries 12 housed in the battery housing section 45 and the inner peripheral wall section of the battery housing section 45.

Thus, in the battery device 10, the flow of the cooling air in the battery housing section 45 is uniform to enable the lithium ion secondary batteries 12 to be cooled uniformly. Also, in the battery device 10, since a turbulent cooling air flow is produced in the cooling air supplied to the arcuate inner surface sections of the upper sides 43b, 44b and the bottom sides 43f, 44f of the inner and outer casing halves 43 and 44, heat transmission is accelerated to promote the cooling of the lithium ion secondary batteries 12 more effectively.

In the battery device 10, a recess 73 is formed in the outer casing half 44 to constitute spatial sections at the upper four corners of the modular casing accommodating space section 11a of the outer casing member 11. In the battery device 10, no stagnant air flow space is left in the four corners of the rectangular spatial section to permit efficient flow of the cooling air in the modular casing accommodating space section 11a. Meanwhile, the recess 73 is used as a hand support for handling the modular casing 13 or as a wrapping guide for cords.

In the battery device 10, the amount of the adhesive 76 used is saved by cementing only the outer peripheral portions of the end extremities of the respective lithium ion secondary batteries 12 to the inner wall sections 46a, 47a of the terminal openings 46, 47. Thus, in the battery device 10, the charging step, as well as the cost for the adhesive 76, can be saved significantly, while the battery device 10 can be reduced in weight. In the battery device 10, if the adhesive 76 is charged in an amount exceeding a predetermined amount into the adhesive charging openings 72, 79, it overflows the terminal openings 46, 47 so that the charging quantity of the adhesive 76 is accurately controlled in the adhesive charging process. In the battery device 10, in which the lithium ion secondary batteries 12 are positively cemented to the inner peripheral wall sections 46a, 47a of the terminal openings 46, 47, the reliability of the battery device 10 can be improved.

In the battery device 10, the lithium ion secondary batteries 12 are cemented in position in the respective terminal openings 46, 47. There are occasions wherein the adhesive 76 is not supplied to the entire outer periphery of the lithium ion secondary batteries 12 to produce the gap between the lithium ion secondary batteries 12 and the terminal openings 46, 47. In the battery device 10, there is the risk that dust and dirt or moisture be intruded through this gap into the inside of the battery housing section 45 of the modular casing 13.

Figure 18:
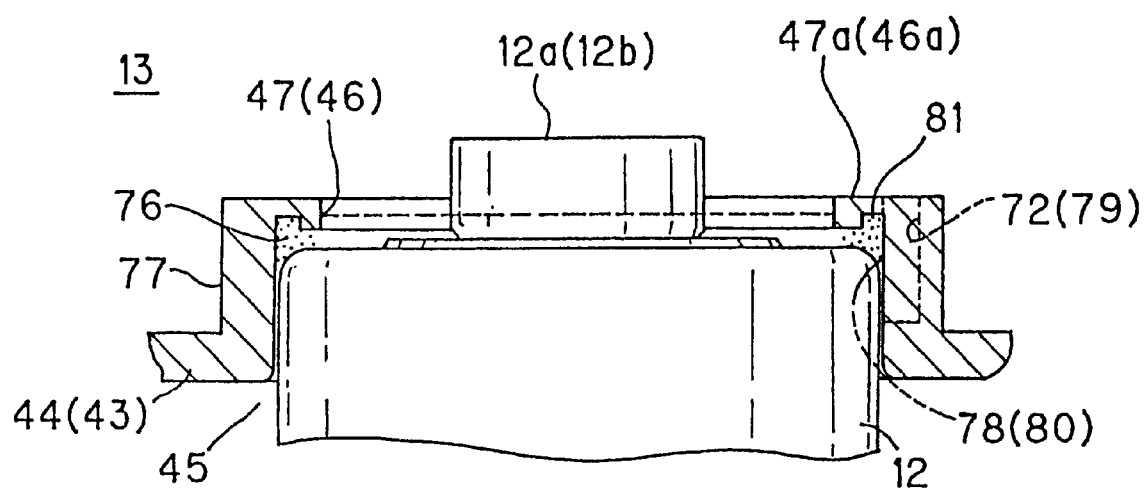
FIG. 18 is a schematic longitudinal cross-sectional view showing another embodiment of the battery housing section.

In order to overcome the above-mentioned problems, an adhesive charging guide groove 81 for supplying the adhesive 76 to the inner peripheral portions of the terminal openings 46, 47 of the modular casing 13 may be formed in the inner surface of the casing half, as shown in FIG. 18.

That is, the adhesive charging guide groove 81 is an annular groove with an inside diameter larger than the inside diameter of the terminal openings 46, 47, and communicates with the adhesive efflux openings 78, 80, as shown in FIG. 18. On the other hand, the adhesive charging guide groove 81 has an outer periphery slightly larger than the outside diameter of the main body portion of the lithium ion secondary battery 12 and a slightly smaller inner periphery.

In the modular casing 13, the main body portion of the lithium ion secondary battery 12 is retained by the inner wall sections 46a, 47a of the terminal openings 46, 47. It is noted that the adhesive charging guide groove 81 extends around the entire periphery in opposition to the end face of the main body portion, as shown in FIG. 18. Thus, in the modular casing 13, the adhesive 76 charged from the adhesive charging openings 72, 79 flows into the inside of the adhesive charging guide groove 81 through the adhesive efflux openings 78, 80. The adhesive 76 is allowed to flow into the entire adhesive charging guide groove 81 and, in this state, is deposited on the end face of the main body portion of the lithium ion secondary battery 12.

The adhesive 76 is cured in this state for cementing the outer periphery and the end face of the main body portion of the lithium ion secondary battery 12 to the inner wall sections 46a, 47a of the terminal openings 46, 47. Thus, the adhesive 76 seals the main body portion of the lithium ion secondary battery 12 to the terminal openings 46, 47 in their entirety to prevent dust and dirt or moisture from being intruded into the inside of the battery housing section 45.

Figure 19:
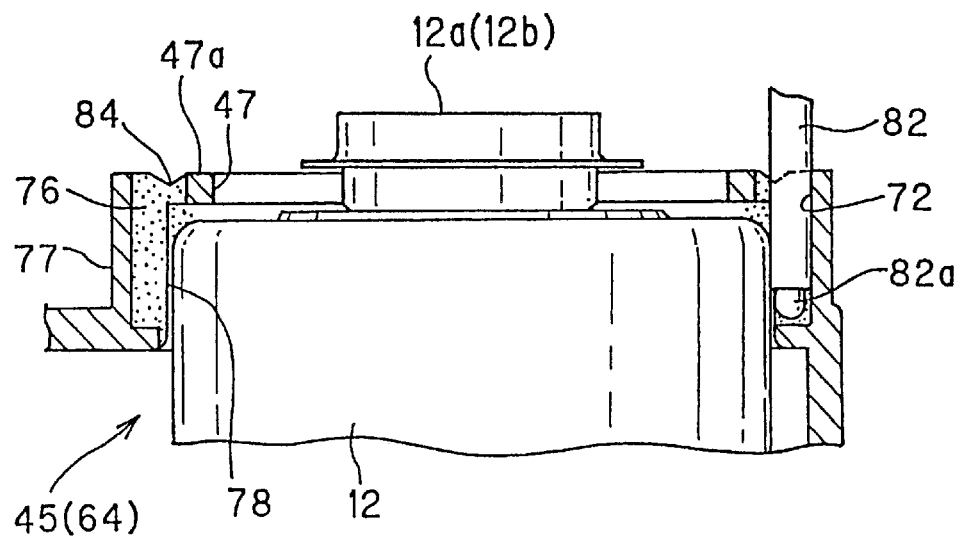
FIG. 19 is a schematic longitudinal cross-sectional view for illustrating the state in which a temperature sensor is mounted on the modular casing.

In the battery device 10, a temperature sensor 82 is also fitted, in the course of the cementing of the lithium ion secondary battery 12 by the adhesive 76, by exploiting the pre-set adhesive charging openings 72 of the outer casing half 44, as shown in FIGS. 15 and 19. The temperature sensor 82 is a bar-shaped thermistor or thermocouple, having an outside diameter slightly smaller than the inside diameter of the adhesive charging opening 72, as shown in FIG. 19. When the temperature sensor 82 is introduced and secured in the adhesive charging opening 72, a glass section 82a fitted to the end of the sensor is roughly contacted with the outer periphery of the lithium ion secondary battery 12.

The temperature sensor 82 measures the surface temperature of one of eight lithium ion secondary batteries 12, grouped together as a set, to detect the abnormal state. For enabling the high accuracy measurement, the temperature sensor 82 is adapted to face the negative terminal 12b of the lithium ion secondary battery 12 and loaded in this state in the adhesive charging opening 72 of the outer casing half 44.

Specifically, the temperature sensor 82 is loaded in the adhesive charging opening 72 of each of the leftmost lithium ion secondary battery 12 in the upper row, rightmost lithium ion secondary battery 12 in the mid row and the rightmost lithium ion secondary battery 12 in the lower row in FIG. 4. The temperature sensor 82 is connected by a sensor cord 83 to an associated one of the cell control units 14. When the surface temperature of the lithium ion secondary battery 12 being measured exceeds a pre-set temperature, the temperature sensor 82 routes a detection signal to the cell control unit 14.

In the above-described cementing step of the lithium ion secondary battery 12, the temperature sensor 82 is introduced into the adhesive charging opening 72 in question in the uncured state of the adhesive 76 charged into the opening 72. The temperature sensor 82 is fixedly secured to the outer casing half 44 on curing of the adhesive 76.

Thus, with the battery device 10, in which the temperature sensor 82 is fitted by exploiting the adhesive charging openings 72 of the outer casing half 44, a simpler structure is obtained. With the battery device 10, since the temperature sensor 82 is fitted to high accuracy in the modular casing 13, the mounting process may be improved in efficiency.

In the battery device 10, in which each temperature sensor 82 is mounted accurately at a pre-set position with respect to the lithium ion secondary battery 12, an accurate and stable detection operation may be achieved. In the battery device 10, in which the temperature sensor 82 is cemented in position by the adhesive 76, whose elastic properties may be maintained even in a cured state, the temperature sensor 82 may be prohibited from being destroyed even on application of vibrations to assure stable detection.

In the battery device 10, it may be an occurrence that, if a pre-set operating test is conducted after assembling, certain lithium ion secondary batteries may be found to be malfunctioning and thus need to be exchanged. In the battery device 10, the lithium ion secondary batteries are accommodated in the battery housing section 45, in a state in which the batteries are safeguarded against accidental removal, with the lithium ion secondary batteries being then cemented by the adhesive 76 to the inner wall sections 46a, 47a of the terminal openings 46, 47.

In the battery device 10, only the malfunctioning lithium ion secondary batteries after assembling can be exchanged by a simplified operation from the side of the outer casing half 44. That is, the holding tubular portion 77 of the outer casing half 44 is formed with an annular guide recess 84 lying on an outer periphery of each terminal opening 47, as shown in FIGS. 15 to 17 and 19. Since the annular guide recess 84 has its inside diameter slightly larger than the outside diameter of the lithium ion secondary battery 12 and is formed in the holding tubular portion 77 with a vee-shaped cross-section, the inner wall section 47a can be reduced in thickness. Also, in the battery device 10, the clamper mounting openings 61, formed on either sides of the holding tubular portion 77, are used in common for mounting an adapter plate 85 for holding the exchanged lithium ion secondary battery 12, as will be explained subsequently in detail.

In the battery device 10, if a malfunction has occurred in a certain lithium ion secondary battery 12, the connection plate member 48 is dismounted from the modular casing 13. That is, in the battery device 10, the inner peripheral wall section 47a of the terminal opening 47 for the lithium ion secondary battery 12 suffering from the malfunction of the outer casing half 44 is punched to increase the diameter, with the annular guide recess 84 as a guide for punching. For this punching of the inner peripheral wall section 47a, an ultrasonic cutter, for example, is used. By a cutter blade of the ultrasonic cutter being moved within the annular guide recess 84, punching may be realized efficiently and accurately without the need to use e.g., a positioning cutter.

Figure 20:
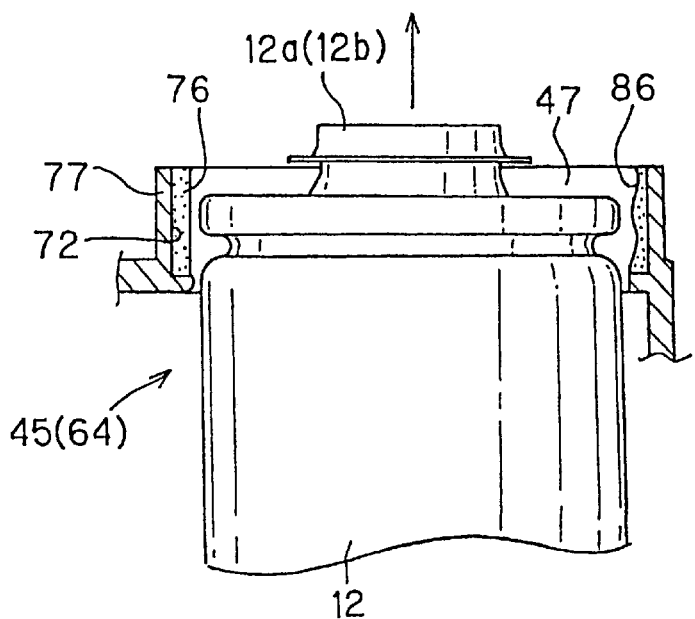
FIG. 20 is a schematic longitudinal cross-sectional view for illustrating the operation of exchanging lithium ion secondary batteries.

In the battery device 10, the adhesive 76 attached to the inner rim of the annular guide recess 84 and to the outer periphery of the lithium ion secondary battery 12 is cut so that a punched opening 86 larger in diameter than the outside diameter of the lithium ion secondary battery 12 can be accurately formed in the holding tubular portion 77 of the outer casing half 44, by a simplified operation, as shown in FIG. 20. Although burrs are produced in the opening edge of the punched opening 86, the opening is sufficient to permit the passage of the lithium ion secondary battery 12 therethrough. In the battery device 10, the lithium ion secondary battery 12, housed in the battery housing section 45, is withdrawn via the punched opening 86, as indicated by arrow in FIG. 20.

Figure 21:
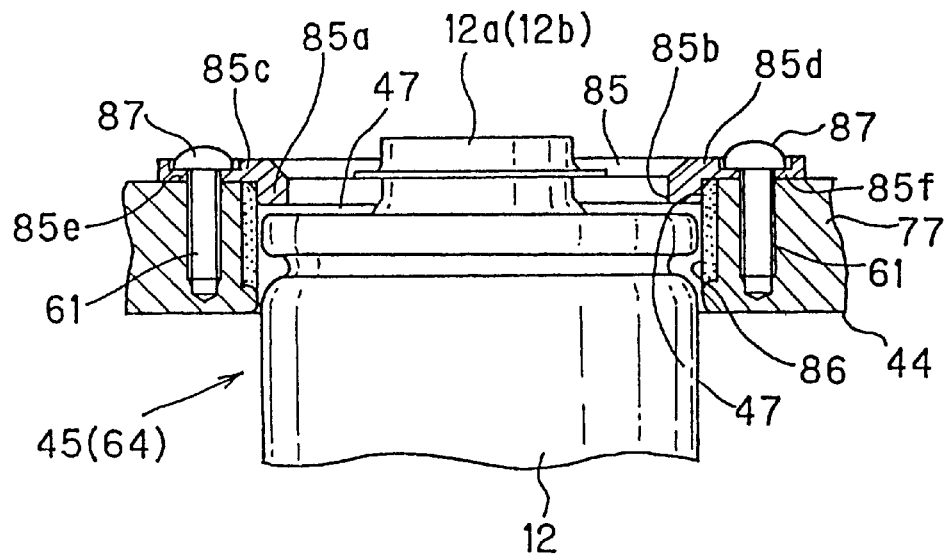
FIG. 21 is a schematic longitudinal cross-sectional view for illustrating the state in which an exchange lithium ion secondary battery has been mounted through an adapter plate in the battery housing section.
Figure 22:
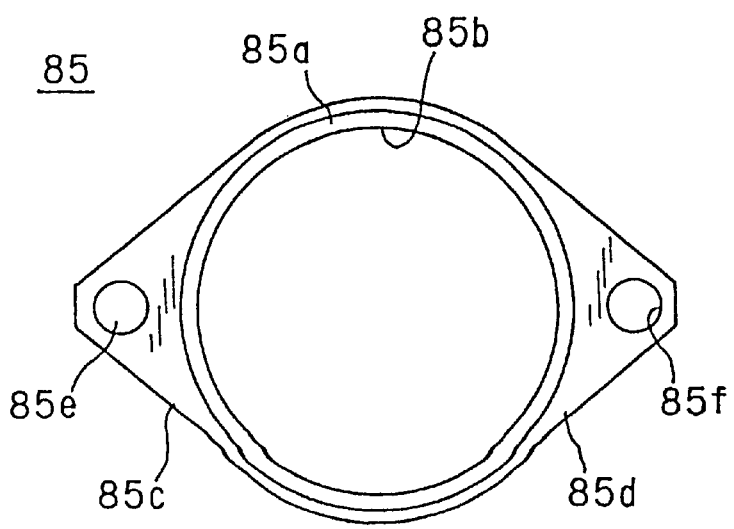
FIG. 22 is a plan view of the adapter plate.
Figure 23:
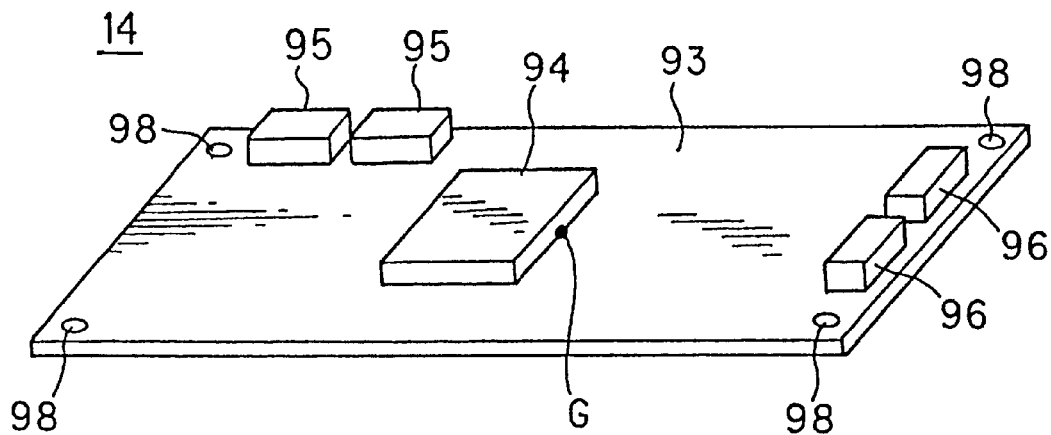
FIG. 23 is a perspective view of a cell control unit.

In the battery housing section 45, a new lithium ion secondary battery 12 is loaded into the inside through the punched opening 86 to take the place of the lithium ion secondary battery 12 taken out. The new lithium ion secondary battery 12 is safeguarded against accidental removal by the adapter plate 85 being mounted on the holding tubular portion 77 in register with the punched opening 86, as shown in FIG. 21.

The adapter plate 85 is molded from the same synthetic resin material as that of, for example, the modular casing 13, and is made up of an annular main body portion 85a having an inner opening 85b, and a pair of mounting flanges 85c, 85d formed as-one with the main body portion 85a. The adapter plate 85 has the inner opening 85b of the main body portion 85a slightly smaller than the outside diameter of the lithium ion secondary battery 12 and permits the positive terminal 12a or the negative terminal 12b to be protruded outwards through this inner opening 85b as the lithium ion secondary battery 12 is safeguarded against accidental removal.

In the mounting flanges 85c, 85d of the adapter plate 85 are formed mounting openings 85e, 85f in register with the clamper mounting openings 61 formed on either sides of the terminal opening 47. As the positive terminal 12a or the negative terminal 12b is exposed through the inner opening 85b, the adapter plate 85 is positioned so that the mounting openings 85e, 85f are in register with the clamper mounting openings 61. The adapter plate 85 is mounted on the holding tubular portion 77 by set screws 87 being threaded into the mounting openings 85e, 85f. Meanwhile, the lithium ion secondary battery 12 is secured to the main body portion 85a of the adapter plate 85 by the adhesive 76 being charged into the space between the inner opening 85b and the outer periphery of the lithium ion secondary battery 12.

In the battery device 10, only the lithium ion secondary battery 12 found to be malfunctioning after assemblage thereof can be exchanged by a simplified operation, as described above. Thus, in the battery device 10, it is unnecessary to replace the entire modular casing 13, while the exchanging operation is facilitated appreciably.

In the battery device 10, the lithium ion secondary battery 12B, arranged to the right side of the lower row in FIG. 4, is connected to the negative terminal member 19a through a fuse device 89 by a wiring cord 88 connected to the connection plate member 48. Although not shown in detail, the fuse device 89 is comprised of a fuse 90 and a fuse holder 91 secured to the upper surface of the hand support recess 36 formed on the side of the stepped portion 24 of the outer casing member 11. The fuse device 89 is interposed between the 48th lithium ion secondary battery 12 and the negative terminal member 19a and assures safety of the battery device 10 even if an excess current is allowed to flow.

In the battery device 10, a sensing cord 92 for detecting the voltage of each lithium ion secondary battery 12 is connected to each connection plate member 48 to detect the voltage of the lithium ion secondary battery 12. For the sensing cord 92, a copper twisted wire with an insulating sheathing, for example, is used. A plurality of such copper wires are collected and held for connection to the associated cell control units 14 as the copper wires are guided by respective mounting portions formed in the inner casing half 43 or in the outer casing half 44.

The battery device 10 is provided with six cell control units 14a to 14f, as described above. The cell control units 14 are comprised of a circuit board 93, carrying a suitable circuit pattern, a micro-processor 94, circuit elements, not shown, or electronic components, loaded on the circuit board 93, plural sensing connectors 95, and an input/output connector 96. In each cell control unit 14, the micro-processor 94, which is large-sized and massive, is loaded at an offset position relative to the center of gravity G of the circuit board 93. In each cell control unit 14, the sensor cord 83 or the sensing cord 92 is connected to the transmission/reception connector member 20a. To the input/output connector 96 of each cell control unit 14, there is connected a connection cord 97 (FIG. 3) connected to the transmission/reception connector member 20a.

In the four corners of the circuit board 93 of each cell control unit 14, there are formed mounting openings 98, as later explained in detail. These mounting openings 98 are placed in register with the fitting weld portions 54, 65 formed on the inner casing half 43 or the outer casing half 44. The cell control units 14, mounted on the inner casing half 43 or the outer casing half 44, are supported by the retention ribs 63, 66 at non-symmetrical positions along the side edges in the mounted state on the inner casing half 43 or on the outer casing half 44.

When the modular casing 13 is housed in the outer casing member 11, each cell control unit 14 has its non-symmetrical points clamped by these retention ribs 63, 66 and the retention ribs 31 formed on the upper half 21. By being held by these retention ribs 31, 63, 66 and by being loaded on the micro-processor 94, the cell control units 14 are suppressed from resonant vibrations caused by vibrations applied to the battery device 10 to assure stationary mounting.

In each control unit 14, the micro-processor 94 or the circuit elements are heated slightly to raise the inner temperature of the outer casing member 11. In the battery device 10, the gaps p and s are produced between each cell control unit 14 and the inner surface of the upper half 21 and between the upper surfaces 43a and 44a of the inner and outer casing halves 43, 44, respectively. Thus, in the battery device 10, the cooling air is guided to these gaps p and s to cool the cell control units 14 efficiently.

The six cell control units 14a to 14f are mounted on the inner casing half 43 and on the outer casing half 44, as shown in FIG. 3. The first cell control unit 14a and the second cell control unit 14b are mounted on the longitudinally arrayed states on the upper surface 44a of the outer casing half 44 constituting the first unit modular casing 13a. The third cell control unit 14c is mounted on the upper surface 43a of the inner casing half 43 constituting the first unit modular casing 13a. The fourth cell control unit 14d is mounted on the upper surface 43a of the inner casing half 43 constituting the second modular casing 13b in parallel with the third unit modular casing 13c. The fifth and sixth cell control units 14e and 14f are mounted in the longitudinally arrayed state on the upper surface 44a of the outer casing half 44 constituting the second unit modular casing 13b.

Figure 25:
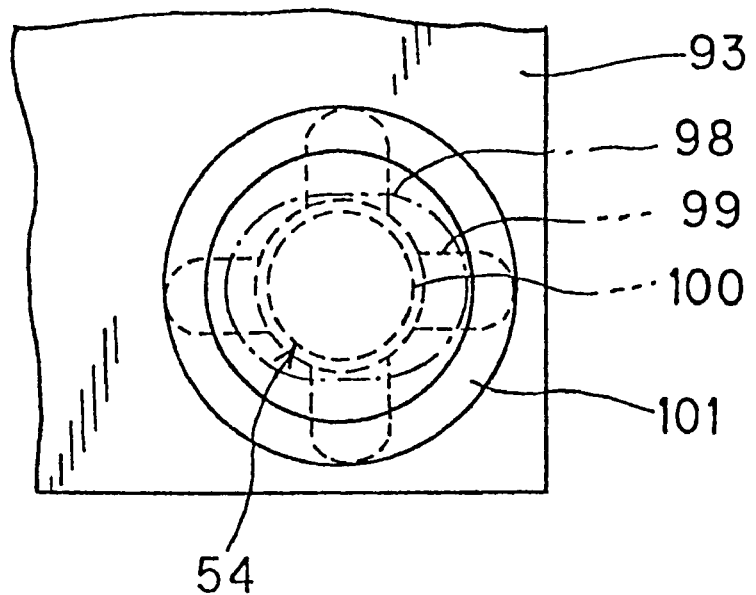
FIG. 25 is a schematic plan view showing the cell control unit.

The fitting weld portion 54 is formed by a stepped projection shown in detail in FIGS. 24 and 25. Meanwhile, the fitting weld portion 65 of the outer casing half 44 is constituted similarly to the fitting weld portion 54 on the inner casing half 43, and hence simply denoted in FIGS. 24 and 25 by the corresponding numerals enclosed in parentheses.

The fitting weld portion 54 is constituted by a stepped projection, as shown in detail in FIGS. 24 and 25. Since the fitting weld portion 65 of the outer casing half 44 is constituted similarly to the fitting weld portion 54 of the inner casing half 43, it is simply denoted in FIGS. 24 and 25 by the corresponding numerals enclosed in parentheses. The fitting weld portion 54 is formed as-one on the upper surface 43c of the inner casing half 43 and is made up of a cross-shaped supporting portion 99 and a shaft-shaped weld portion 100 of a smaller diameter than the mounting opening 98 mounted upright on its upper end. The supporting portion 99 is larger in diameter than the inside diameter of the mounting opening 98 and has a height corresponding to the gap s.

Figure 26:
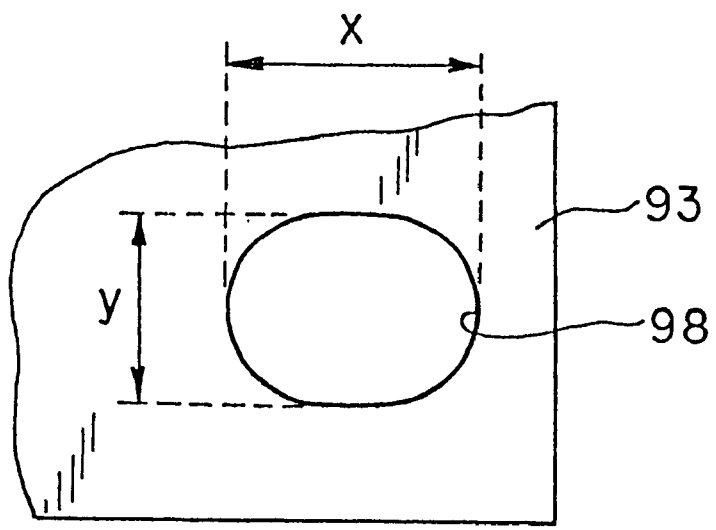
FIG. 26 is a plan view for illustrating the structure of the cell control unit.

The mounting opening 98 is formed as an elliptical opening with a long axis diameter x and a short axis diameter y, with the long axis lying along the length of the circuit board 93, as shown in FIG. 26. With the circuit board 93, the long axis diameter x and the short axis diameter y of the mounting opening 98 are optimized, as will be explained subsequently. The mounting opening 98 has the short axis diameter y smaller than the maximum outside diameter of the supporting portion 99 of the fitting weld portion 54 and larger than the outside diameter of the shaft-shaped weld portion 100.

In the cell control units 14, the weld portion 100 of the fitting weld portion 54 formed on the inner casing half 43 or the outer casing half 44 is fitted in the mounting opening 98. A washer 101 of the fitting weld portion 54 is fitted on the weld portion 100 of the fitting weld portion 54 formed on the inner casing half 43 or on the outer casing half 44. The washer 101 has its outside diameter larger than the long axis diameter of the mounting opening 98 of the circuit board 93, and is formed of metal or synthetic resin.

The fitting weld portion 54 is welded in this state to the weld portion 100, as shown in FIG. 24. In this manner, the cell control units 14 are mounted on the inner casing half 43 by having the circuit board 93 held on the fitting weld portion 54, with the rim of the circuit board 93 being clamped between the supporting member 99 and the washer 101.

Meanwhile, since the battery device 10 is loaded in use on the hybrid system car 4, the battery device 10 is subjected to mechanical load, such as severe vibrations, while being subjected to a load of changes in temperature and humidity over a wide range, when the car is in driven state. In the battery device 10, the inner casing half 43 or the outer casing half 44, constituting the modular casing 13, is formed of a synthetic resin material having a thermal expansion coefficient of 50 ppm/° C., whilst the fitting weld portions 54, 65 of a fitting weld portion set are formed at a separation of 200 mm in the longitudinal direction. Thus, in the battery device 10, if the fitting weld portions 54, 65 are arranged in the mating positions under a temperature condition of 25° C., a dimensional offset of approximately 0.74 mm and approximately 0.48 mm is produced at 125° C. and at −40° C., respectively.

If, in the the battery device 10, the cell control units 14 are fixedly mounted on the modular casing 13, there is imposed a significant mechanical load on the fitting weld portions 54, 65 and on the circuit board 93 due to the dimensional shift caused by the aforementioned changes in temperature. In the battery device 10, the fitting weld portions 54, 65 are subjected to cracks under these mechanical loads, or warping or tensile force is applied to soldered portions of the mounted components or the circuit pattern to cause exfoliation thereof.

In the battery device 10, the cell control units 14 are movable within the extent of the difference between the long axis diameter x of the mounting opening 98 and the outside diameter of the weld portion 100 of the fitting weld portion 54, such that the dimensional offset caused by the change in the temperature condition can be absorbed by optimizing the mounting opening 98 and the fitting weld portion 54.

The optimizing range of the long axis diameter x of the mounting opening 98 is given by $$\chi \geq \chi 1 + \chi 2$$

where $\chi$ is an optimum value for the mounting opening 98 and the fitting weld portion 54, $\chi 1$ is an optimum value of $\chi$ which will not produce mechanical loads against temperature changes on the circuit board 93 from a standard temperature t0 to a maximum temperature of t1 and $\chi 2$ is an optimum value of $\chi$ which will not produce mechanical load on the circuit board 93 against temperature changes from the standard temperature t0 to the minimum temperature t2.

It is sufficient if the optimum value $\chi$ of the mounting opening 98 and the fitting weld portion 54 is such that an optimum value $\chi$ of the maximum temperature t1 is given by $$\chi 1 \geq (\tau 2 - \tau 1) \times (t0 - t1) \times ((A \pm \alpha) + (R \pm \gamma))/2$$

whilst an optimum value $\chi 2$ of the minimum temperature t2 is given by $$\chi 2 \geq (\tau 2 - \tau 1) \times (t2 - t0) \times ((A \pm \alpha) + (R \pm \gamma))/2$$

where the thermal expansion coefficient of the circuit board 93 is τ1 (ppm/° C.), the thermal expansion coefficient of the circuit board 93 is τ2 (ppm/° C.), the gap of the fitting weld portion 54 is A±α mm and the outside diameter of the weld portion 100 is R±γ mm. Therefore, the optimum value $\chi$ is set to meet the following conditions:

$$\chi \geq (\tau 2 - \tau 1) \times (\tau 2 - \tau 1) \times ((A \pm \alpha) + (R \pm \gamma))/2$$

and $$\chi \geq \chi 1 + \chi 2.$$

It is noted that, in the battery device 10, the mounting structure of the cell control units 14 to the modular casing 13 is not limited to the modular casing 13. In the battery device 10, the reference mounting opening 98 may be circular, with the other mounting openings 98 being elongated openings. If the battery device 10 is mounted on a moving object used under a condition in which the change range of the temperature environment is smaller, the totality of the mounting openings 98 or the mounting openings 98 on only one longitudinal side may be circular. In the battery device 10, tubular mounting portions may be provided on the modular casing 13 in place of the fitting weld portions 54, 65 and a set screw may be mounted through the mounting opening 98 in the mounting portion to secure the cell control units 14.

In the battery device 10, the fitting weld portions 54, 65 are constructed so that the weld portions 100 are formed as-one with the cross-shaped supporting portion 99. This structure is, of course, merely illustrative since the fitting weld portions 54, 65 may be formed by a columnar or a prismatic member at least the supporting portion 99 of which has an outside diameter slightly larger than the short axis diameter y of the mounting opening 98.

If, after assembling the battery device 10, malfunction has occurred in the cell control units 14, the fitting weld portions 54, 65 are severed by e.g., a cutter to dismount the cell control units 14. In the battery device 10, resin mounting members, formed similarly to the fitting weld portions 54, 65, are used for the modular casing 13. These mounting members are first mounted on the modular casing 13 by thermal fusion, after which the exchange cell control units 14 are mounted in position.

Meanwhile, in the battery device 10, the 24 lithium ion secondary batteries 12 housed in the battery housing section 45 are interconnected by the connection plate members 48, as described above. In the battery device 10, the modular casings 13a, 13b are combined to each other so that the leftmost lithium ion secondary battery 12A of the lower row on one side will face the rightmost lithium ion secondary battery 12B of the lower row on the opposite side.

In the battery device 10, the lithium ion secondary battery 12A on one side constitutes the first one of the 48 lithium ion secondary batteries 12 housed in the paired unit modular casings 13a, 13b. The lithium ion secondary battery 12A is connected to the positive terminal member 18a through a wiring cord 102 connected to the positive terminal member 18a. The wiring cord 102 is held by the cord clamper 57 as shown in FIG. 4 and turned around the modular casing 13 through the recess 72 to reach to the connector unit 17.

In the battery device 10, the lithium ion secondary battery 12B on the opposite side constitutes the 48th battery of the set of the lithium ion secondary batteries. The lithium ion secondary battery 12B is connected to the fuse device 89 through the wiring cord 88 connected to the terminal plate member 48B. The wiring cord 88 is held by the cord clamper 57 as shown in FIG. 4 and led through the recess 72 to the connector member 17. Meanwhile, the lithium ion secondary battery 12B is connected through the fuse device 89 to the negative terminal member 19a.

In the battery device 10, the respective voltages of the 48 lithium ion secondary batteries 12, connected in series with one another between the positive terminal member 18a and the negative terminal member 19a, as described above, and the voltages of the battery modules, each made up of eight lithium ion secondary batteries, are monitored and controlled by the above-mentioned cell control units 14. That is, the cell control units 14 are each made up of a unit battery controller 103, individually monitoring the voltages of the eight lithium ion secondary batteries 12 constituting each battery module, a battery voltage controller 104 for controlling the voltage of each lithium ion secondary battery 12, and a communication controller 105, as shown in FIG. 27.

The cell control units 14 are respectively connected to the sensing connector 95 so as to be fed with the voltage information. To the sensing connector 95 is connected the sensing cord 92, connected in turn to each lithium ion secondary battery 12. The cell control units 14 perform the above-described control operation and the control signal routing operation based on the voltage information.

Figure 27:
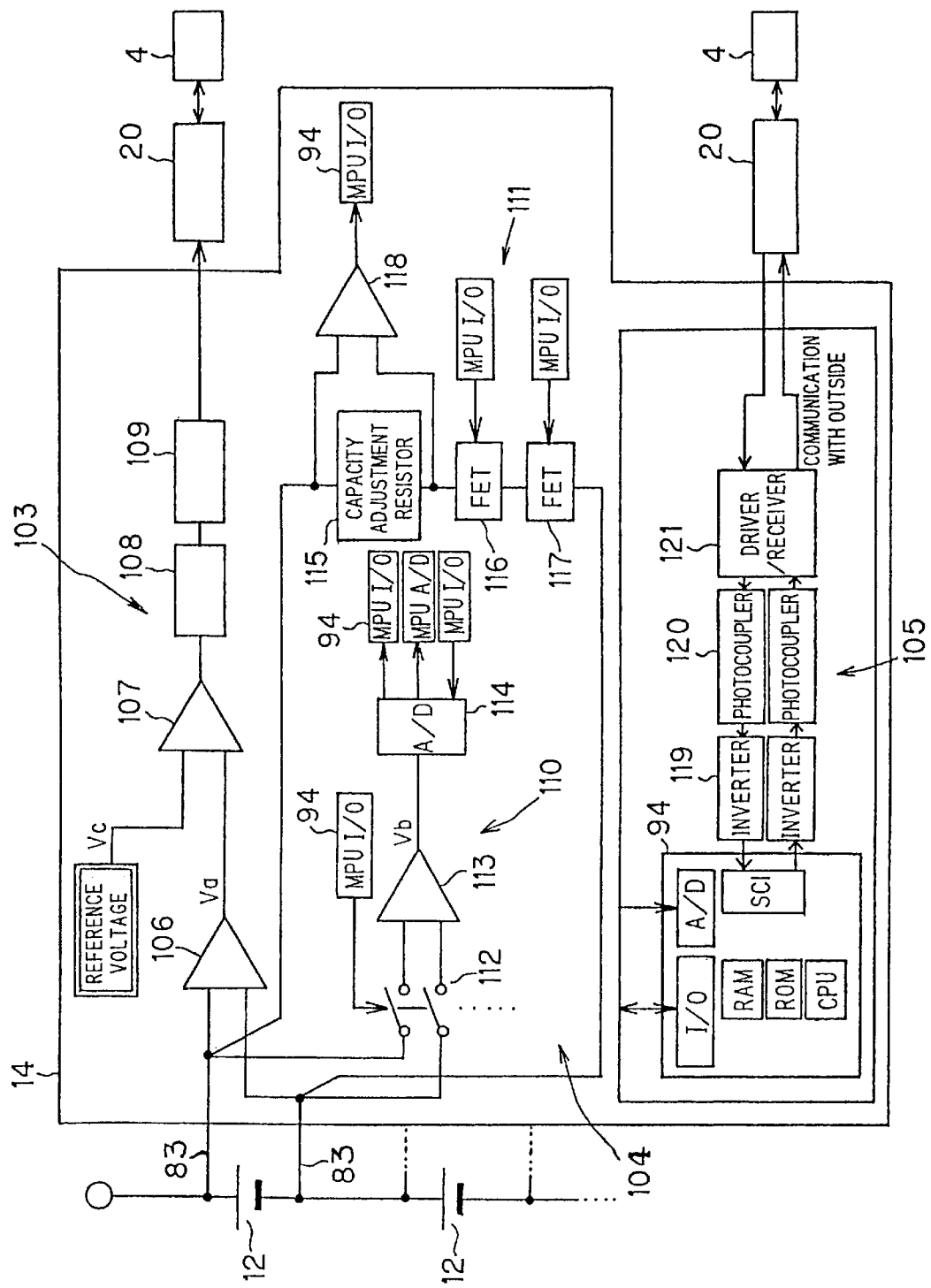
FIG. 27 is a block diagram of the cell control unit.

The unit battery controller 103 includes a voltage detector 106, a comparator 107 for comparison to a reference voltage, an inverter 108 and a photocoupler 109, as shown in FIG. 27. The unit battery controller 103 detects the individual voltages of the lithium ion secondary batteries 12 by the voltage detector 106 to compare a detected voltage value at the comparator 107 to the reference voltage Vc. If the unit battery controller 103 detects that the detected voltage Va is lower than the reference voltage Vc, the unit battery controller 103 sends an alarm output through the invertor 108 and the photocoupler 109 to the transmission/reception terminal unit 20.

In the cell control units 14, the alarm output is routed through the connection cord 97 connected to the input/output connector 96 to the transmission/reception connector member 20a of the transmission/reception terminal unit 20. In the battery device 10, the alarm output is transmitted through the transmission/reception terminal unit 20 to the controller 4 of the hybrid system car 1. In the hybrid system car 1, a control output is sent from the controller 4, based on the alarm output, to produce an alarm sound or make alarm display by an indicator.

The battery voltage controller 104 is made up of a voltage detector 110 for detecting the voltage of each lithium ion secondary battery 12, and a capacity adjustment unit 111 for adjusting the capacity of each lithium ion secondary battery 12, and issues a control output to the controller 4 of the hybrid system car 1 based on the detected result. The voltage detector 110 includes a large number of changeover switches 112, for selecting the lithium ion secondary batteries 12 based on the output of the micro-processor 94, a voltage detector 113 for detecting the voltage of the selected lithium ion secondary battery 12 and an analog/digital converter 114.

The voltage detector 110 detects, by the voltage detector 113, the voltage values Vb of a pre-set number of the lithium ion secondary batteries 12, based on the changeover operation by the changeover switch 112, converts the voltage value information by the analog/digital converter 114 and routes the converted output to the micro-processor 94. The analog/digital converter 114 converts the data signals routed from the micro-processor 94.

The capacity adjustment unit 111 is made up of a capacity adjustment resistor 115, transistors 116 and 117, series connected to one another, and a capacity detector 118 connected across an input and an output of the capacity adjustment resistor 115. The capacity adjustment unit 111 routes the capacity information of the lithium ion secondary battery 12, detected by the voltage detector 115, to the micro-processor 94, which then sends a control signal derived from the capacity information to the transistors 116, 117 to operate the capacity adjustment resistor 115 to adjust the capacity of the lithium ion secondary batteries 12 exhibiting fluctuations in capacitance values.

The communication controller 105 is responsible for exchange of internal signals sent from the respective components, and for exchange of control signals with the controller through the transmission/reception connector member 20a of the transmission/reception terminal unit 20. The communication controller 105 converts detection signals or control signals through an invertor 119, a photocoupler 120 and a driver/receiver 121 whilst exchanging data with the micro-processor 94 and the controller 4.

With the battery device 10, having the cell control units 14 as described above, the voltage and capacity values of the respective lithium ion secondary batteries 12 and the battery module made up of eight lithium ion secondary batteries are monitored at all times. When the cell control units 14 have detected that the voltage value of the lithium ion secondary battery 12 is below the reference voltage value Vc, the battery device 10 sends out a detection signal to the controller 4 of the hybrid system car 1 through the transmission/reception terminal unit 20. In the hybrid system car 1, an alarm sound is issued, or an alarm is displayed on the indicator, as described above, based on the detection signal.

In the battery device 10, a data request command for the voltage or the capacity of each lithium ion secondary battery 12 or each battery module is sent from the controller 4 of the hybrid system car 1 to the micro-processor 94 of the cell control units 14. The battery device 10 sends out the requested data from the cell control units 14 to the controller 4. If, in the battery device 10, the presence of the lithium ion secondary battery 12 suffering from the voltage variations is detected in the capacity adjustment unit 111 of the battery voltage controller 104, the lithium ion secondary battery 12 is discharged by a control output from the micro-processor 94 to lower the voltage by way of voltage averaging.

In the cell control units 14, the temperature information of the pre-set lithium ion secondary battery 12 accommodated in the modular casing 13 is detected by the temperature sensor 82 and routed through the sensor cord 83. The cell control units 14 have the functions of transmitting the information on the voltage, capacity or the temperature of the lithium ion secondary batteries 12 or the battery modules and receiving control signals from the controller 4 of the hybrid system car 1. Thus, the cell control units 14 provide variable control operations by suitably combining these functions.

The battery device 10 is loaded on the battery loading unit 6 provided on the rear seat of the hybrid system car 1, as described above. The battery device 10 is in a state of high temperature, under the effect of radiant heat from the road, if the hybrid system car 1 is used during summer or in tropical regions. Also, the battery device 10 is in a state of low temperature, under the effect of cold atmospheric air, if the hybrid system car 1 is used during winter or in frigid regions. Also, if the hybrid system car 1 runs under rainy weather or on bad roads, the battery device 10 tends to be flooded with muddy water. If the hybrid system car 1 is running continuously at an elevated speed or on bad roads, the battery device 10 may be subjected to severe impacts or vibrations.

Even under these adverse conditions of use, the lithium ion secondary batteries 12 or the respective battery modules exhibit sufficient properties, whilst the monitoring and controlling operations are performed reliably, by the cell control units 14. In the battery device 10, the cell control units 14 are mounted on the upper portion of the modular casing 13 with the gap s, while being sealed in the interior of the outer casing member 11 through the gap p. In the battery device 10, the adhesives 42, 76, that are able to maintain elastic properties even in a cured state, are used for cementing the upper half 21 or the lower half 22, making up the outer casing member 11, the inner casing half 43 and the outer casing half 44, making up the modular casing 13, or the lithium ion secondary batteries 12, accommodated in the battery housing section 45.

Thus, in the battery device 10, in which the lithium ion secondary batteries 12 are accommodated in the battery housing section 45, constructed as a dual casing structure comprised of the outer casing member 11 and the modular casing 13 with respect to outside, and in which the inside thereof is kept in a well-ventilated state, the effect of the external environment is reduced. If vibrations or impacts are applied to the battery device 10, air-tightness may be maintained in the interior of the outer casing member 11.

For confirming that the performance of the battery device 10 may be kept under the aforementioned adverse conditions, the following impact and water flooding tests were conducted. Specifically, the battery device 10, in the fully charged state of the lithium ion secondary batteries 12, was subjected to an impact test of applying impacts to the battery device 10 in the fore-and-aft and left-and right directions and to an impact test of dropping a steel ball weighing 500 g from a height of 20 mm on the battery device 10. The battery device 10 was also subjected to a humidity resistance test of allowing the battery device 10 to stand at 60° C. in 95% RH for one hour and to a test of immersing the battery device in water with a depth of 0 m, by way of the water flooding test. The battery device 10 was also subjected to a heat impact test of subjecting the battery device to 10 to 100 cycles of alternating low and high temperatures, each cycle consisting of a 40° C. environment and a 70° C. environment, each continuing for one hour.

It was confirmed that, in any of the above tests, the monitoring and controlling operations by the cell control units 14 can be carried out reliably.

The present invention is, of course, not limited to the above-described embodiments. Although the cell control units 14 are mounted on the upper surface of the modular casing 13, they may also be mounted on their lateral sides. The battery device 10 can be mounted not only on the hybrid system car 1, but also on other variable moving members, such as other electric cars, vessels carrying a battery device, or unmanned exploring machines or devices.

What is claimed is:

1. A battery device able to be loaded on a moving body, comprising:
    a modular casing having a battery housing section therein and a plurality of terminal openings;
    a plurality of secondary batteries housed in said battery housing section so that terminal portions thereof are exposed to outside through said terminal openings;
    an adhesive charging opening and an adhesive efflux opening part in register with each terminal opening, said adhesive efflux opening part communicating with each terminal opening and with the adhesive charging opening;
    an adhesive charged through the adhesive charging opening, said adhesive efflux opening part being arranged to cause said adhesive to flow around the peripheral surface of each secondary battery; and
    each secondary battery being cemented by said adhesive to peripheral wall portions around said terminal openings.

2. The battery device able to be loaded on a moving body according to claim 1, wherein said modular casing is combined from a first modular casing half and a second modular casing half each of which has battery housing half spatial sections opened in one lateral side and said terminal opening on another lateral side thereof.

3. The battery device able to be loaded on a moving body according to claim 1, wherein said modular casing is housed in an outer casing member.

4. The battery device able to be loaded on a moving body according to claim 1, wherein said adhesive is selected from the group consisting of an urethane-composite adhesive agent, a silicon-composite adhesive agent and a modified silicon-composite adhesive agent.

5. The battery device able to be loaded on a moving body according to claim 1, wherein:
    an annular adhesive charging guide groove communicating with said adhesive charging opening through said adhesive efflux opening part is formed in an inner surface of the outer periphery of each terminal opening; and
    said adhesive flowing around the outer periphery of each secondary battery through said adhesive charging guide groove to seal the entire space between the outer periphery of said secondary battery and the terminal opening.

6. The battery device able to be loaded on a moving body according to claim 1, wherein:
    an annular guide recess larger in diameter than each respective secondary battery is formed around each terminal opening in said modular casing; and an opening peripheral wall of said terminal opening being punched through said annular guide recess to form a punched opening through which the respective secondary battery can be exchanged.

7. The battery device able to be loaded on a moving body according to claim 6, wherein:

an adapter plate is mounted in a mounting opening provided around said annular guide recess, said adapter plate having an opening through which each respective secondary battery is retained in a state in which the terminal thereof is exposed; and said adapter plate being mounted to close said punched opening.

8. The battery device able to be loaded on a moving body according to claim 1, wherein a temperature sensor is introduced and mounted in said adhesive charging opening.

9. The battery device able to be loaded on a moving body according to claim 1, wherein:

said secondary batteries are lithium ion secondary batteries, and a pre-set number of the batteries are connected in series with one another and grouped together as a set to constitute a battery module, there being provided a plurality of such sets.

10. The battery device able to be loaded on a moving body according to claim 9, further comprising:

a cell control unit including a circuit board, and a microprocessor and circuit elements or electronic components loaded on said circuit board, said cell control unit detecting or controlling the voltage of said secondary batteries or said battery module or controlling the capacity of said secondary batteries or said battery module.

11. The battery device able to be loaded on a moving body according to claim 10, wherein:

said cell control unit is mounted in a mounting opening formed in the circuit board by fitting a fitting weld portion provided on the mounting portion formed on the modular casing and by thermally fusing said fitting weld portion; and said mounting opening being an elongated opening.

* * * * *